(12) United States Patent
Sasaki et al.

(10) Patent No.: US 11,594,754 B2
(45) Date of Patent: *Feb. 28, 2023

(54) SOLID ELECTROLYTE AND ALL-SOLID LITHIUM-ION SECONDARY BATTERY

(71) Applicant: TDK CORPORATION, Tokyo (JP)

(72) Inventors: Takashi Sasaki, Tokyo (JP); Tetsuya Ueno, Tokyo (JP); Gakuho Isomichi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/497,624

(22) PCT Filed: Mar. 29, 2018

(86) PCT No.: PCT/JP2018/013486
§ 371 (c)(1),
(2) Date: Sep. 25, 2019

(87) PCT Pub. No.: WO2018/181827
PCT Pub. Date: Oct. 4, 2018

(65) Prior Publication Data
US 2020/0020978 A1    Jan. 16, 2020

(30) Foreign Application Priority Data

Mar. 30, 2017  (JP) .............................. JP2017-066604

(51) Int. Cl.
*H01M 10/00* (2006.01)
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0077* (2013.01)

(58) Field of Classification Search
CPC ......... H01M 10/0562; H01M 10/0525; H01M 2300/0077; H01M 10/052; Y02E 60/10; C01B 25/45; H01B 1/06
See application file for complete search history.

(56) References Cited

U.S. PATENT DOCUMENTS

| 2010/0028782 A1 | 2/2010 | Inda |
| 2011/0244337 A1 | 10/2011 | Ohta et al. |
| 2012/0231350 A1 | 9/2012 | Nishida et al. |
| 2012/0308900 A1 | 12/2012 | Ogasa |

(Continued)

FOREIGN PATENT DOCUMENTS

| CN | 104600356 A | 5/2015 |
| EP | 3428929 A1 | 1/2019 |

(Continued)

OTHER PUBLICATIONS

Jul. 3, 2018 International Search Report issued in International Patent Application No. PCT/JP2018/013486.

(Continued)

*Primary Examiner* — Nicholas P D'Aniello
(74) *Attorney, Agent, or Firm* — Oliff PLC

(57) ABSTRACT

This solid electrolyte is a zirconium phosphate-based solid electrolyte in which a part of phosphorous or zirconium that is contained in the solid electrolyte is substituted with an element with a variable valence.

11 Claims, 16 Drawing Sheets

(56) References Cited

U.S. PATENT DOCUMENTS

| | | | |
|---|---|---|---|
| 2012/0328959 A1* | 12/2012 | Hayashi | H01M 10/0525 |
| | | | 429/319 |
| 2013/0273437 A1 | 10/2013 | Yoshioka et al. | |
| 2014/0134504 A1* | 5/2014 | Brown | H01M 8/1004 |
| | | | 429/403 |
| 2014/0197351 A1 | 7/2014 | Balagopal et al. | |
| 2015/0064576 A1* | 3/2015 | Aitken | C03C 3/068 |
| | | | 429/322 |
| 2015/0118573 A1 | 4/2015 | Yokoyama et al. | |
| 2015/0333366 A1 | 11/2015 | Sato et al. | |
| 2016/0141716 A1* | 5/2016 | Ito | H01M 4/136 |
| | | | 429/162 |
| 2016/0164135 A1* | 6/2016 | Fasching | H01M 4/136 |
| | | | 429/319 |
| 2019/0067736 A1 | 2/2019 | Yoshioka et al. | |
| 2021/0036362 A1 | 2/2021 | Ueno et al. | |

FOREIGN PATENT DOCUMENTS

| | | | |
|---|---|---|---|
| JP | H02-250264 A | 10/1990 | |
| JP | H03-081908 A | 4/1991 | |
| JP | H04-160011 A | 6/1992 | |
| JP | H05-299101 A | 11/1993 | |
| JP | 2001-143754 A | 5/2001 | |
| JP | 2010-202499 A | 9/2010 | |
| JP | 2010-272344 A | 12/2010 | |
| JP | 2011-070939 A | 4/2011 | |
| JP | 2012-246196 A | 12/2012 | |
| JP | 2013-149493 A | 8/2013 | |
| JP | 2014-229579 A | 12/2014 | |
| JP | 2015-049981 A | 3/2015 | |
| JP | 2015-065022 A | 4/2015 | |
| JP | 2015-076324 A | 4/2015 | |
| JP | 2015-216220 A | 12/2015 | |
| JP | 2015-216221 A | 12/2015 | |
| JP | 2016-001595 A | 1/2016 | |
| JP | 2016-051539 A | 4/2016 | |
| WO | 2012/008422 A1 | 1/2012 | |
| WO | 2017/154922 A1 | 9/2017 | |

OTHER PUBLICATIONS

Jun. 12, 2018 Search Report issued in International Patent Application No. PCT/JP2018/013452.
Jun. 3, 2020 Office Action issued in Chinese Patent Application No. 201880021434.6.
Apr. 14, 2021 Office Action Issued in U.S. Appl. No. 16/491,036.
Jul. 3, 2018 Search Report issued in International Patent Application No. PCT/JP2018/013477.
Apr. 2, 2021 Office Action issued in U.S. Appl. No. 16/490,861.
Aug. 3, 2021 Office Action Issued in U.S. Appl. No. 16/490,861.
Jun. 5, 2018 International Search Report issued in International Patent Application No. PCT/JP2018/013139.
Apr. 2, 2021 Office Action issued in U.S. Appl. No. 16/490,940.
Jun. 23, 2021 U.S. Office Action issued U.S. Appl. No. 16/490,940.
U.S. Appl. No. 16/490,861, filed Sep. 3, 2019 in the name of Sasaki et al.
U.S. Appl. No. 16/490,940, filed Sep. 4, 2019 in the name of Isomichi et al.
U.S. Appl. No. 16/491,036, filed Sep. 4, 2019 in the name of Sasaki et al.
Aug. 3, 2021 Office Action Issued in U.S. Appl. No. 16/491,036.
Translation of Sep. 21, 2021 Office Action issued in Japanese Application No. 2019-510194.
Translation of Sep. 21, 2021 Office Action issued in Japanese Application No. 2019-510197.
Nov. 18, 2021 Office Action issued in U.S. Appl. No. 16/491,036.
Dec. 13, 2021 Office Action issued in U.S. Appl. No. 16/490,861.
Dec. 10, 2021 Office Action issued in U.S. Appl. No. 16/490,940.
Apr. 11, 2022 Office Action Issued In U.S. Appl. No. 16/491,036.
Translation of Mar. 18, 2022 Office Action issued in Chinese Application No. 201880021444.X.
Translation of Mar. 22, 2022 Office Action issued in German Application No. 112018001797.4.
Translation of Mar. 22, 2022 Office Action issued in German Application No. 112018001798.2.
Translation of Mar. 23, 2022 Office Action issued in German Application No. 112018001738.9.
Translation of Feb. 18, 2022 Office Action issued in Chinese Application No. 201880021650.0.
Feb. 25, 2022 Advisory Action issued in U.S. Appl. No. 16/491,036.
Jun. 3, 2022 Office Action Issued in U.S. Appl. No. 16/490,861.
Translation of May 10, 2022 Office Action issued in Japanese Application No. 2019-510185.
Oct. 19, 2022 Advisory Action issued in U.S. Appl. No. 16/490,861.
Jolley, "Improving the ionic conductivity of NASICON through aliovalent cation substitution of Na3Zr2Si2PO12", Ionics 21, 3031-3038 (Jul. 2015).
Katsuhiro Nomura, "Research on Zirconium Phosphate-based Solid Electrolytes", Mar. 23, 2993.
Homepage of KOBELCO Research Institute, "Test preparation/ evaluation of oxide-based all-solid-state battery (PDF technical material)", https://kobelcokaken.co.jp/business/sb_prototype/oxide-based.pdf.
Nov. 1, 2022 Office Action issued in Chinese Application No. 201880021650.0.
T. Asai et al, "Mixed Conductivity of Na1+4xMx11Fe2xIIIZr2-3xP3O12,M []:Fe2+, Co2+ and Ni2+", Solid State Ionics 35, 319-322 (1989).
Jan. 6, 2023 Notice of Reasons for Revocation issued in Japanese Application No. 2019-510197.

* cited by examiner

SOLID ELECTROLYTE AND ALL-SOLID LITHIUM-ION SECONDARY BATTERY

TECHNICAL FIELD

The present invention relates to a solid electrolyte and an all-solid lithium-ion secondary battery.

The application is based upon and claims the benefit of priority from Japanese Patent Application No. 2017-066604, filed Mar. 30, 2017, the entire contents of which are incorporated herein by reference.

BACKGROUND ART

Using a non-retardant polymer electrolyte and an ionic liquid as electrolytes for batteries has been considered. However, both electrolytes contain organic substances. For this reason, it is difficult to eliminate concern regarding liquid leakage, liquid depletion, and the like from batteries using these materials.

Meanwhile, all-solid lithium-ion secondary batteries using ceramics as electrolytes are essentially non-combustible, are safe, and can eliminate concerns regarding liquid leakage, liquid depletion, and the like. Therefore, all-solid lithium-ion secondary batteries have attracted attention in recent years.

As solid electrolytes for all-solid lithium-ion secondary batteries, various materials have been reported. For example, Patent Document 1 discloses that $LiZr_2(PO_4)_3$ can be used as a solid electrolyte. Meanwhile, there is a problem that $LiZr_2(PO_4)_3$ changes to a crystal structure with low ionic conductivity at a temperature of equal to or less than 60° C. and the ionic conductivity is degraded.

Also, Patent Document 2 and 3 disclose that a part of zirconium in $LiZr_2(PO_4)_3$ is substituted with an element with a valence that does not easily change, such as Ca. A stable phase of a crystal changes, and a rhombohedral crystal with high ionic conductivity is still maintained at room temperature by substituting a part of this element.

CITATION LIST

Patent Literature

[Patent Document 1]
Japanese Unexamined Patent Application, First Publication No. 2016-51539
[Patent Document 2]
Japanese Unexamined Patent Application, First Publication No. 2015-65022
[Patent Document 3]
Japanese Unexamined Patent Application, First Publication No. 2015-76324

SUMMARY OF INVENTION

Technical Problem

However, it is not possible to keep electronic insulation when the amount of Li in a solid electrolyte varies in a case in which a part of an element is substituted with an element with a valence that does not easily change in a case as described above. As a result, self-discharge occurs, and the discharge capacity of the all-solid lithium-ion secondary battery is degraded.

The invention was made in view of the aforementioned problems, and an object thereof is to provide a solid electrolyte capable of maintaining a crystal structure with high ionic conductivity and still maintaining electronic insulation when the amount of Li varies.

Solution to Problem

The present inventors have conducted intensive studies in order to solve the aforementioned problems.

As a result, the present inventors have found that it is possible to prevent electrons contained in an energy level derived from zirconium or oxygen from being used for charge compensation during charging and discharging and to maintain electronic insulation by substituting a part of a zirconium phosphate-based solid electrolyte with an element with a variable valence. That is, the invention provides the following means in order to solve the aforementioned problems.

(1) A solid electrolyte according to a first aspect of the invention is a solid electrolyte which is a zirconium phosphate-based solid electrolyte, in which a part of phosphorous or zirconium that is contained in the solid electrolyte is substituted with an element with a variable valence.

The aforementioned solid electrolyte preferably has the following features. These features may also be preferably combined with each other.

(2) In the solid electrolyte according to the aforementioned aspect, the element with a variable valence may be at least one selected from the group consisting of Ti, V, Cr, Mn, Fe, Co, Ni, Cu, Zn, Nb, Sb, Ta, Bi, Mo, Te, W, Ge, and Se.

(3) Either a configuration in which a part of zirconium that is contained in the solid electrolyte according to the aforementioned aspect is substituted with at least one selected from the group consisting of V, Nb, Sb, Ta, Bi, Mo, Te, and W or a configuration in which a part of phosphorous that is contained in the solid electrolyte is substituted with at least one selected from the group consisting of Ge, Mo, W, Cr, Mn, Fe, Se, and Te may be employed.

(4) Either a configuration in which a part of zirconium that is cot in the solid electrolyte according to the aforementioned aspect is substituted with at least one selected from the group consisting of Ti, V, Cr, Mn, Nb, Sb, Ta, Bi, Mo, Te, and W or a configuration in which a part of phosphorous that is contained in the solid electrolyte is substituted with at least one selected from the group consisting of Ge, Mo, Sb, W, Bi, Cr, Mn, Fe, Se, Te, and V may be employed.

(5) The solid electrolyte according to the aforementioned aspect may contain a compound represented as a formula $Li_xM1_yZr_{2-y}W_zP_{3-z}O_{12}$, in which M1 is at least one selected from the group consisting of Mn and Ni, and in a case in which the amount of Mn in M1 is assumed to be $y_{Mn}$, and the amount of Ni is assumed to be $y_{Ni}$, $0 \le y_{Mn} < 1$, $0 \le y_{Ni} < 1$, $1+2y_{Ni-z} \le x \le 1+2y_{Mn}+3y_{Ni}+5z$, $0 \le y < 1$, and $0 \le z < 1.5$ may be satisfied.

(6) An all-solid lithium-ion secondary battery according to a second aspect is a solid electrolyte including the solid electrolyte according to the aforementioned aspect.

(7) In the aforementioned all-solid lithium-ion secondary battery, a relative density of a pair of electrode layers and a solid electrolyte layer that has the solid electrolyte between the pair of electrode layers may be equal to or greater than 80%.

(8) The solid electrolyte according to the aforementioned aspect may include: only the compound represented as $Li_xM1_yZr_{2-y}W_zP_{3-z}O_{12}$.

Advantageous Effects of Invention

The solid electrolyte according to the aforementioned aspects can maintain a crystal structure with high ionic conductivity and can still maintain electronic insulation when the amount of Li varies.

DESCRIPTION OF EMBODIMENTS

Figure 1:
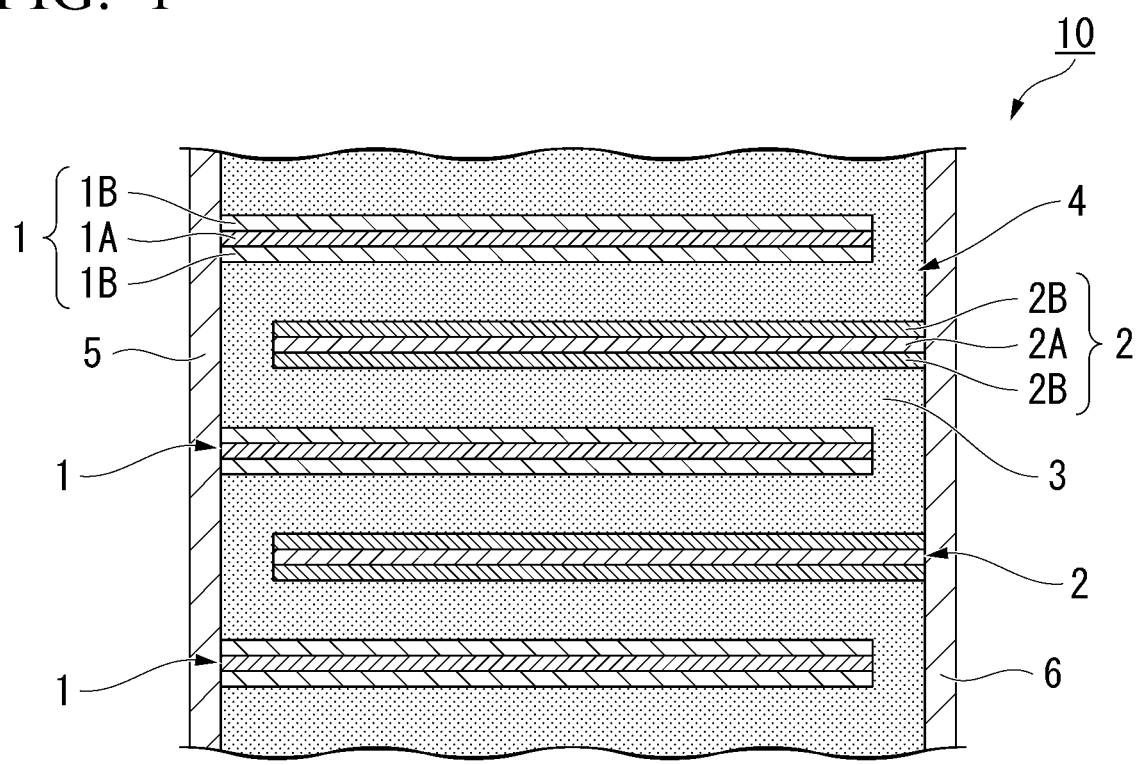
FIG. 1 is a schematic outline sectional view showing a preferred example of an all-solid lithium-ion secondary battery according to a first embodiment of the invention.

Hereinafter, preferred embodiments and preferred examples of the invention will be described in detail appropriately referring to drawings. The drawings used in the following description may show characteristic portions in an enlarged manner for convenience for easy understanding of features of the invention. Therefore, dimensional ratios and the like of the respective components in the drawings may be the same or may be different from actual dimensional ratios and the like. Materials, dimensions, and the like in the following description are just exemplary examples, and the invention is not limited thereto and can be appropriately modified and realized without changing the gist thereof.

Also, omissions, additions, modifications, replacements, exchanges, and the like can be made on the numbers, locations, sizes, amounts, types, members, dimensions, combinations, and the like in the following description without departing from the gist of the invention.

[All-Solid Lithium-Ion Secondary Battery]

An all-solid lithium-ion secondary battery has at least one first electrode layer 1, at least one second electrode layer 2, and a solid electrolyte 3 interposed between the first electrode layer 1 and the second electrode layer 2 that are vertically adjacent to each other. The first electrode layer 1, the solid electrolyte 3, and the second electrode layer 2 are laminated in order, thereby forming a layered body 4. Each first electrode layer 1 is connected to a terminal electrode 5 disposed on one end side (the left side in the drawing), and each second electrode layer 2 is connected to the other terminal electrode 6 disposed on the other end side (the right side in the drawing). That is, the first electrode layer 1 and the second electrode layer 2 are connected to two mutually different external terminals and are embedded in the solid electrolyte 3 without being brought into direct contact with each other in this example.

Any one of the first electrode layer 1 and the second electrode layer 2 functions as a positive electrode layer, and the other functions as a negative electrode layer.

Hereinafter, the first electrode layer 1 is assumed to be a positive electrode layer 1, and the second electrode layer 2 is assumed to be a negative electrode layer 2 for easy understanding.

As shown in FIG. 1, the positive electrode layer 1 and the negative electrode layer 2 are alternately laminated with a solid electrolyte 3 therebetween. The all-solid lithium-ion secondary battery 10 is charged and discharged through exchange of lithium ions between the positive electrode layer 1 and the negative electrode layer 2 via the solid electrolyte 3.

"Solid Electrolyte"

The solid electrolyte 3 is a zirconium-phosphate-based solid electrolyte. The zirconium phosphate-based solid electrolyte means a solid electrolyte in which phosphorous, zirconium, and oxygen form main portions of a basic skeleton. The aforementioned solid electrolyte may contain a zirconium phosphate-based compound or a substituted compound thereof or may substantially include only a zirconium phosphate-based compound or a substituted compound thereof. The aforementioned zirconium phosphate-based compound or the substituted compound thereof preferably contains, as basic constituent elements, phosphorous, zirconium, and oxygen. Representative examples of such a solid electrolyte is $LiZr_2(PO_4)_3$, and examples of the zirconium phosphate-based solid electrolyte include a substance in which a part of elements thereof are substituted.

In the solid electrolyte 3, a part of phosphorous or zirconium contained in the solid electrolyte is substituted with another element. If a part of this element contained in the solid electrolyte changes due to substitution, a stable state of a crystal state of the solid electrolyte 3 may change. As a result, the solid electrolyte 3 can still maintain a rhombohedral crystal without being changed to a triclinic structure around room temperature. The rhombohedral crystal structure has more lithium ionic conduction paths than those in a triclinic structure and exhibits excellent ionic conductivity.

Also, in the solid electrolyte 3 according to the embodiment, the element with which a part of phosphorous or zirconium is substituted is an element with a variable valence. Since it is possible to prevent electrons derived from zirconium or oxygen contained in the basic skeleton from being used for charge compensation at the time of charging and discharging if a part of phosphorous or zirconium in the solid electrolyte is substituted with an element with a variable valence, it is possible to maintain electronic insulation. Hereinafter, description will be given on the basis of a specific example.

FIGS. 2A to 2D are diagrams showing characteristics when the amount of Li in the solid electrolyte in which a part of zirconium contained in the solid electrolyte is substituted with calcium that is an element with a valence that does not easily change is caused to change. Specifically, these drawings show characteristics of the solid electrolyte represented as a formula $Li_{1+0.5x}Ca_{0.5}Zr_{1.5}(PO_4)_3$.

Figure 2A:
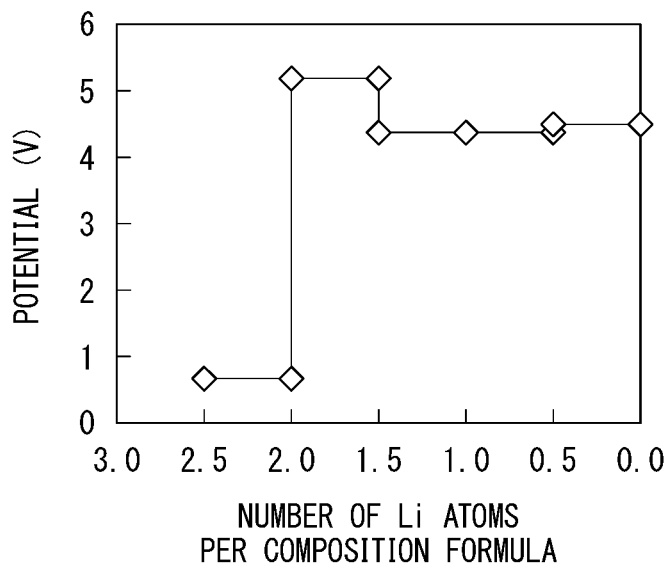
FIG. 2A is a diagram showing a change in potential when the number of Li atoms per composition formula changes in a solid electrolyte in which a part of zirconium contained in the solid electrolyte is substituted with calcium that is an element with a valence that does not easily change.
Figure 2B:
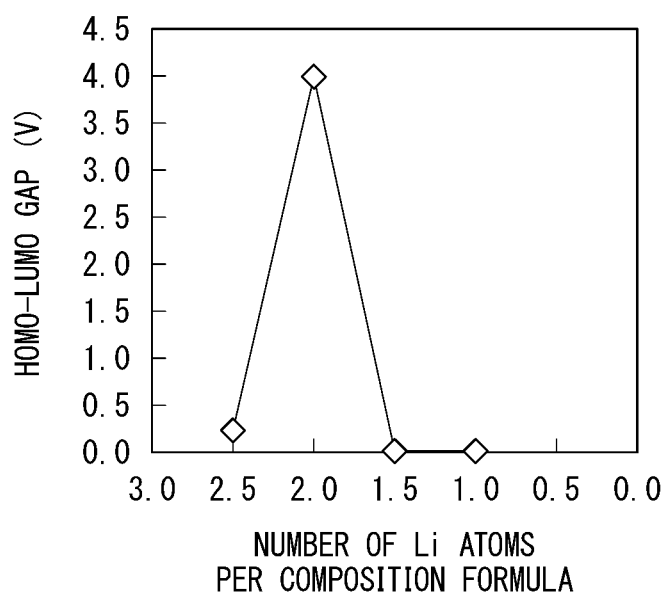
FIG. 2B is a diagram showing the size of a highest occupied orbital (HOMO)-lowest unoccupied activation (LUMO) gap of a solid electrolyte with respect to the number of Li atoms per composition formula in the solid electrolyte in which a part of zirconium contained in the solid electrolyte is substituted with calcium that is an element with a valence that does not easily change.
Figure 2C:
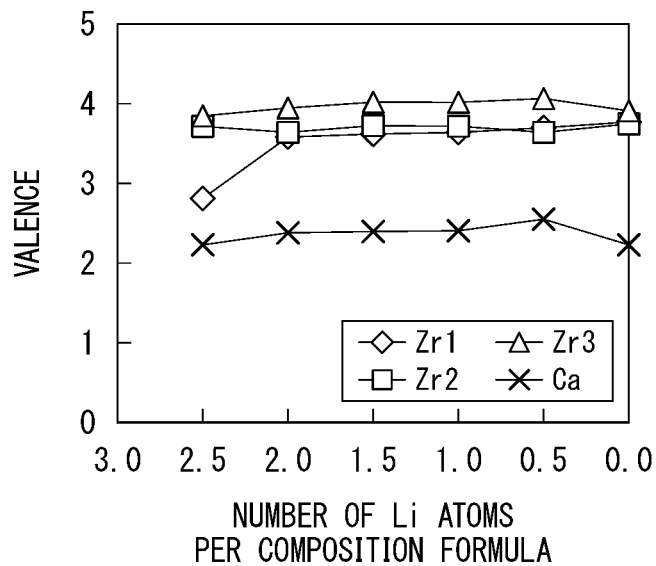
FIG. 2C is a diagram showing changes in valences of zirconium and calcium, which are contained in a solid electrolyte, when the number of Li atoms per composition formula changes in the solid electrolyte in which a part of zirconium contained in the solid electrolyte is substituted with calcium that is an element with a valence that does not easily change.
Figure 2D:
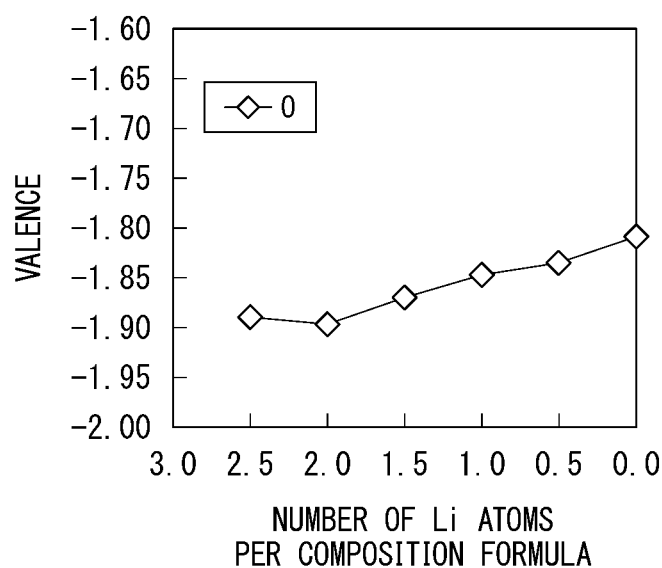
FIG. 2D is a diagram showing a change in valence of oxygen contained in a solid electrolyte when the number of Li atoms per composition formula changes, in the solid electrolyte in which a part of zirconium contained in the solid electrolyte is substituted with calcium that is an element with a valence that does not easily change.

In FIGS. 2A to 2D, FIG. 2A is a diagram showing a change in potential of the solid electrolyte when the number of Li atoms per composition formula changes. FIG. 2B is a diagram showing a size of a HOMO-LUMO gap of the solid electrolyte with respect to the number of Li atoms per composition formula. FIG. 2C is a diagram showing changes in valences of zirconium and calcium contained in the solid electrolyte when the number of Li atoms per composition formula changes. FIG. 2D is a diagram showing a change in valence of oxygen contained in the solid electrolyte when the number of Li atoms per composition formula changes. Zr1, Zr2, and Zr3 mean sites where zirconium is present in the crystal structure.

As shown in FIG. 2B, the HOMO-LUMO gap of the solid electrolyte suddenly decreases merely by the number of Li atoms per composition formula slightly deviating from 2.0 in a case of substitution with calcium. A decrease in the HOMO-LUMO gap means that the solid electrolyte cannot maintain electronic insulation.

The HOMO-LUMO gap suddenly decreases since electrons derived from zirconium and oxygen contained in the basic skeleton of the solid electrolyte are used for charge compensation at the time of charging and discharging. If electrons derived from zirconium and oxygen contained in the basic skeleton are used for charge compensation, carriers are supplied to the inside of the solid electrolyte, and the solid electrolyte cannot maintain electronic insulation.

It is confirmed from FIGS. 2C and 2D that electrons derived from zirconium and oxygen contained in the basic skeleton of the solid electrolyte are used for charge compensation at the time of charging and discharging. In FIG. 2C, the valence of Zr1 suddenly changes substantially when the number of Li atoms contained in the solid electrolyte exceeds 2.0. Also, in FIG. 2D, the valence derived from oxygen starts to change substantially when the number of Li atoms contained in the solid electrolyte falls below 2.0. That is, it is possible to state that electrons derived from zirconium and oxygen are used for charge compensation at the time of charging and discharging.

The solid electrolyte in the all-solid lithium-ion secondary battery contributes to the exchanging of lithium ions between the positive electrode and the negative electrode. In addition, electrons move between the positive electrode and the negative electrode via the terminal electrode and the external terminals. Since the electrons to move between the positive electrode and the negative electrode via the terminal electrode and the external terminals move through the solid electrolyte if it becomes impossible to maintain electronic insulation of the solid electrolyte, the all-solid lithium-ion secondary battery cannot maintain a charged state even if the exchanging of the electrons with external circuits is blocked.

That is, the solid electrolyte in which a part of zirconium contained in the solid electrolyte is substituted with calcium that is an element with a valence that does not easily change can maintain electronic insulation only when the number of Li atoms per composition formula is about 2.0.

Meanwhile, FIGS. 3A to 3D are diagrams showing characteristics of the solid electrolyte 3 according to the embodiment. In the solid electrolyte 3, a part of zirconium is substituted with manganese with a variable valence. The solid electrolyte 3 shown herein is represented as a formula $Li_{1+0.5x}Mn_{0.5}Zr_{1.5}(PO_4)_3$.

Figure 3A:
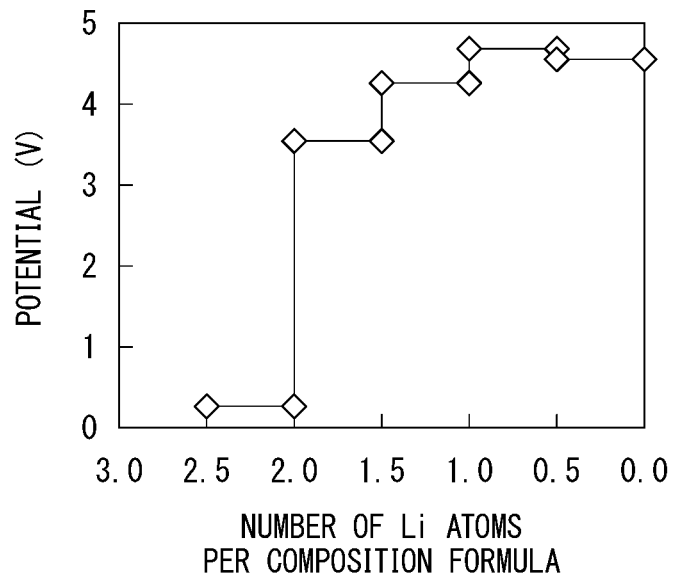
FIG. 3A is a diagram showing a change in potential when the number of Li atoms per composition formula changes in the solid electrolyte according to the embodiment in which a part of zirconium contained in the solid electrolyte is substituted with manganese that is an element with a variable valence.
Figure 3B:
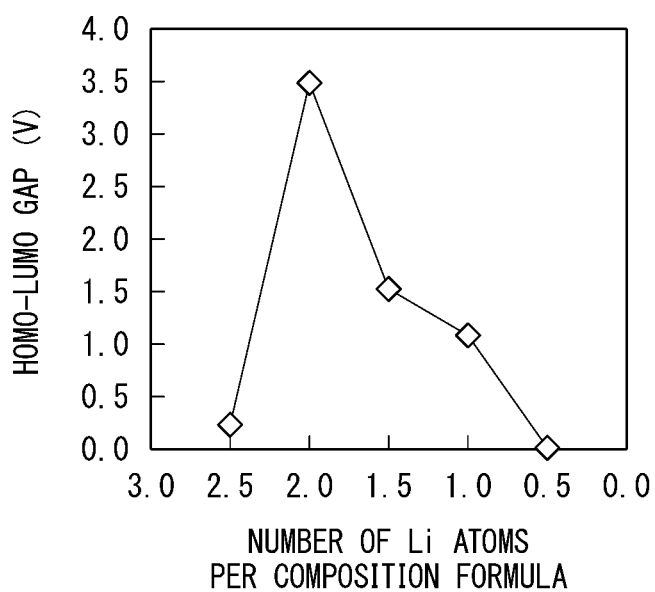
FIG. 3B is a diagram showing a size of a HOMO-LUMO gap of the solid electrolyte with respect to the number of Li atoms per composition formula in the solid electrolyte according to the embodiment in which a part of zirconium contained in the solid electrolyte is substituted with manganese that is an element with a variable valence.
Figure 3C:
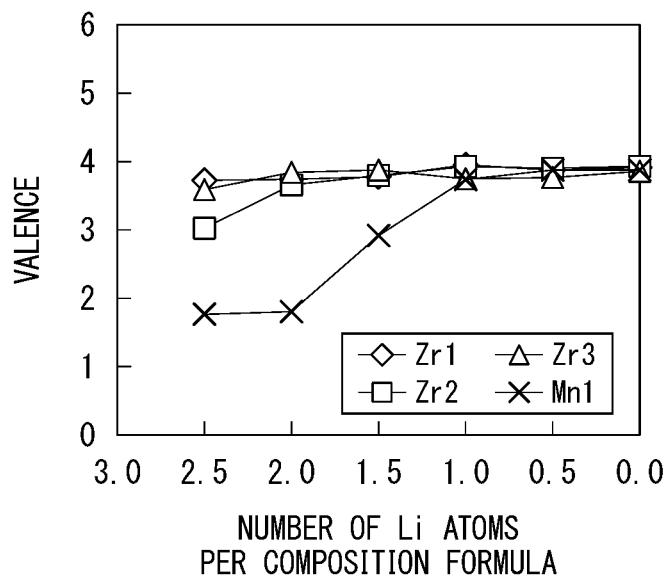
FIG. 3C is a diagram showing changes in valences of zirconium and manganese contained in the solid electrolyte when the number of Li atoms per composition formula changes in the solid electrolyte according to the embodiment in which a part of zirconium contained in the solid electrolyte is substituted with manganese that is an element with a variable valence.
Figure 3D:
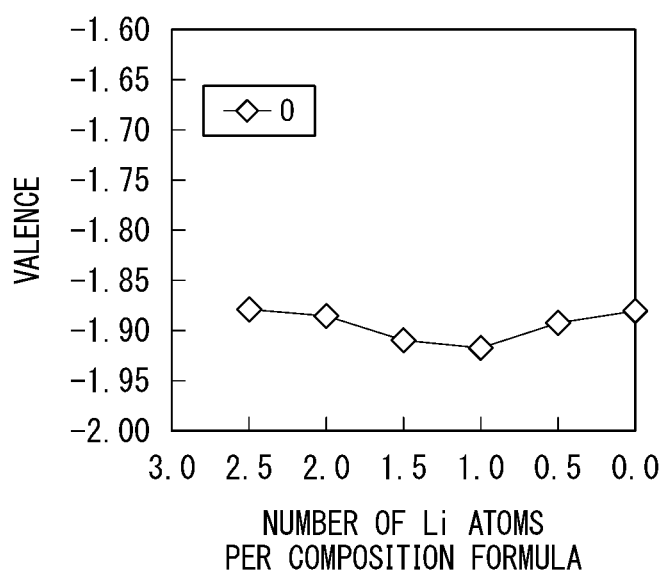
FIG. 3D is a diagram showing a change in valence of oxygen contained in a solid electrolyte 3 when the number of Li atoms per composition formula changes in the solid electrolyte according to the embodiment in which a part of zirconium contained in the solid electrolyte is substituted with manganese that is an element with a variable valence.

In FIGS. 3A to 3D, FIG. 3A is a diagram showing a change in potential when the number of Li atoms per composition formula changes. FIG. 3B is a diagram showing a size of a HOMO-LUMO gap of the solid electrolyte 3 with respect to the number of Li atoms per composition formula. FIG. 3C is a diagram showing changes in valences of zirconium and manganese contained in the solid electrolyte 3 when the number of Li atoms per composition formula changes. FIG. 3D is a diagram showing a change in valence of oxygen contained in the solid electrolyte 3 when the number of Li atoms per composition formula changes.

In a case of substitution with manganese as shown in FIG. 3B, the solid electrolyte 3 keeps a HOMO-LUMO gap of equal to or greater than 0.5 e V and maintains electronic insulation within a wide range in which the number of Li atoms per composition formula is about 0.7 to about 2.4. This is because the substituting element with a variable valence contributes to charge compensation at the time of charging and discharging and electrons of zirconium and oxygen contained in the basic skeleton of the solid electrolyte 3 are prevented from being used for charge compensation at the time of charging and discharging.

In FIG. 3C, the valence of manganese significantly changes while the valences of Zr1 to Zr3 do not significantly vary. Also, in FIG. 3D, the valence of oxygen does not also significantly vary. That is, since charge compensation is assigned to manganese with a valence that changes, and no carriers are supplied to the inside of the solid electrolyte 3, the solid electrolyte 3 can maintain electronic insulation.

As a result, the all-solid lithium-ion secondary battery using the solid electrolyte 3 according to the embodiment still appropriately operates when the number of Li atoms per composition formula significantly changes. This is because the solid electrolyte 3 can utilize a wide range of Li and electronic insulation can be maintained even when the number of Li per composition formula changes significantly, as shown in FIG. 3A.

Figure 4:
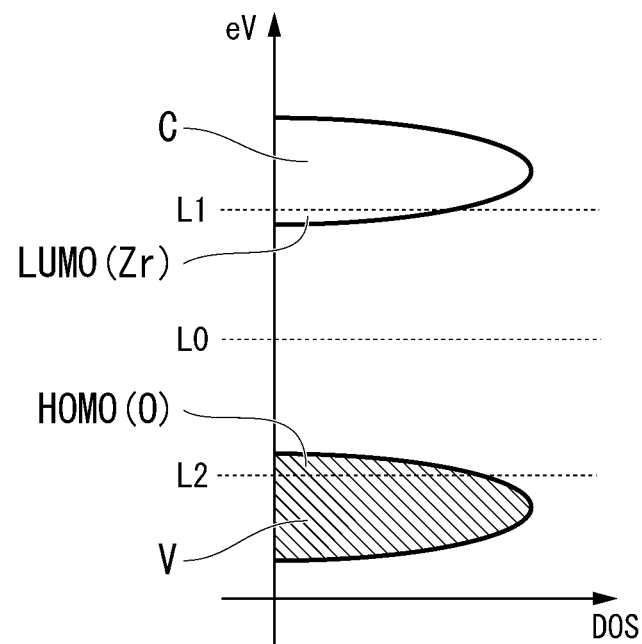
FIG. 4 is a schematic view of a band structure of a solid electrolyte substituted with an element with a valence that does not easily change.

The aforementioned details can be described as follows in terms of the band structure of the solid electrolyte. FIG. 4 is a schematic view of a band structure of a solid electrolyte substituted with an element with a valence that does not easily change. In the drawing, DOS represents density of states. As shown in FIG. 4, a HOMO level is present in a valence band V, and a LUMO level is present in a conduction band C in the solid electrolyte substituted with an element with a valence that does not easily change. The HOMO level includes a level of an electronic orbital derived from oxygen contained in the basic skeleton of the solid electrolyte, and the LUMO level includes a level of an electronic orbital derived from zirconium contained in the basic skeleton of the solid electrolyte.

In the solid electrolyte shown in FIG. 4, a Fermi level is present at a location indicated by the reference numeral L0 when the number of Li atoms is a specific number (the number of Li atoms per composition formula is 2.0 in FIGS. 2A to 2D). In this case, a gap is present between the HOMO level and the LUMO level, and the solid electrolyte has electronic insulation.

If Li is further applied to the solid electrolyte from this case, the LUMO level receives electrons, and the location of the Fermi level moves from the location indicated by the reference numeral L0 to the location indicated by the reference numeral L1. Meanwhile, if Li comes out from the solid electrolyte, electrons are taken away from the HOMO level. That is, holes are added to the HOMO level, and the location of the Fermi level moves from the location indicated by the reference numeral L0 to the location indicted by the reference numeral L2. In both cases, the metallic band structure is achieved. As a result, electronic insulation of the solid electrolyte suddenly decreases (FIG. 2B), and the range of the number of available Li atoms per composition formula becomes narrower (FIG. 2A).

Figure 5:
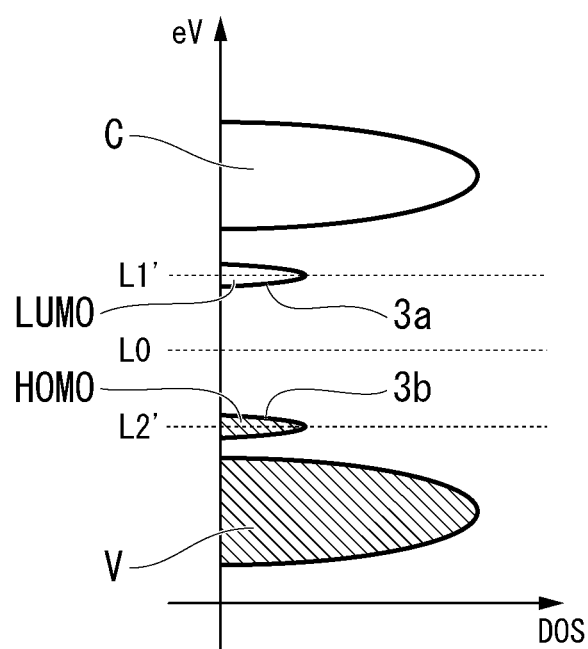
FIG. 5 is a schematic view of a band structure of a solid electrolyte substituted with an element with a variable valence.

Meanwhile, FIG. 5 is a schematic view of a band structure of the solid electrolyte 3 substituted with an element with a variable valence. As shown in FIG. 5, the solid electrolyte substituted with an element with a variable valence has at least either an unoccupied impurity level 3a with no occupation of electrons and an occupied impurity level 3b with occupation of electrons between a valence band V and a conduction band C. That is, in this case, the HOMO level is outside the valence band V, and the LUMO level is outside the conduction band C.

As shown in FIG. 5, if Li intrudes into the solid electrolyte in the condition where the Fermi level is present at the location indicated by the reference numeral L0, the unoccupied impurity level 3a is first reduced, and electrons enter the unoccupied impurity level 3a (the location of the Fermi level moves from the location indicated by the reference numeral L0 to the location indicated by the reference numeral L1'). Meanwhile, if electrons come out from the solid electrolyte in a situation where the Fermi level is present at the location indicated by the reference numeral L0, the electrons are first taken away from the occupied impurity level, and holes enter an occupied impurity level 3b (the location of the Fermi level moves from the location indicated by the reference numeral L0 to the reference numeral L2'). Therefore, the energy gap is kept between the unoccupied impurity level 3a and the conduction band C or between the occupied impurity level 3b and the valence band V. As a result, the solid electrolyte 3 can keep electronic insulation (FIG. 3B), and the range of the number of available Li atoms becomes wider (FIG. 3A).

In this manner, the solid electrolyte 3 according to the embodiment can prevent electrons derived from zirconium and oxygen contained in the basic skeleton from being used for charge compensation at the time of charging and discharging and keep electronic insulation by a part of phosphorous or zirconium being substituted with an element with a variable valence.

As the element with a variable valence with which a part of phosphorous or zirconium of the solid electrolyte 3 is substituted, at least one selected from the group consisting of Ti, V, Cr, Mn, Fe, Co, Ni, Cu, Zn, Nb, Sb, Ta, Bi, Mo, Te, W, Ge, and Se can be used. If a part of phosphorous or zirconium is substituted with such elements, the solid electrolyte 3 can still maintain the rhombohedral crystal structure at room temperature. Also, since any of them has a variable valence and it is not necessary to use the level derived from zirconium or oxygen for charge compensation at the time of charging and discharging, the solid electrolyte can maintain electronic insulation.

In a case in which a part of zirconium is substituted with an element with a variable valence, the element with a variable valence is preferably at least one selected from the group consisting of V, Nb, Sb, Ta, Bi, Mo, Te, and W. Also, in a case in which a part of phosphorus is substituted with an element with a variable valence, the element with a variable valence is preferably at least one selected from the group consisting of Ge, Mo, W, Cr, Mn, Fe, Se, and Te.

If a part of zirconium or phosphorous of the solid electrolyte 3 is substituted with these elements, the unoccupied impurity level 3a or the occupied impurity level 3b is formed in gaps of the valence band V and the conduction band C.

As described above, electrons in the unoccupied impurity level 3a is used for charge compensation at the time of discharging, and electrons in the occupied impurity level 3b is used for charge compensation at the time of charging. The solid electrolyte 3 can maintain electronic insulation both at the time of charging and at the time of discharging by the solid electrolyte 3 satisfactorily balancing the unoccupied impurity level 3a and the occupied impurity level 3b.

Also, in a case in which a part of zirconium is substituted with an element with a variable valence, the element with a variable valence may be at least one selected from the group consisting of Ti, V, Cr, Mn, Nb, Sb, Ta, Bi, Mo, Te, and W, and in a case in which a part of phosphorous is substituted with an element with a variable valence, the element with a variable valence may be at least one selected from the group consisting of Ge, Mo, Sb, W, Bi, Cr, Mn, Fe, Se, Te, and V.

These elements are element with relatively large valences among elements with variable valences. If a difference in valences between phosphorous or zirconium forming the basic skeleton of the solid electrolyte 3 and the substituted element is large, in order to adjust a valence difference, the levels composed of oxygen are oxidized by a multiple of the difference in valence. Therefore, since the number of introduced impurity levels increases, it is possible to widen the range of the amount of Li per composition formula with which electronic insulation can be maintained.

Also, the solid electrolyte 3 may specifically be a compound represented as Formula (1) below:

$$Li_xM1_yZr_{2-y}W_zP_{3-z}O_{12} \qquad (1)$$

Here, M1 is at least one selected from the group consisting of Mn and Ni. In a case in which the amount of Mn in M1 is assumed to be $y_{Mn}$ and the amount of Ni is assumed to be $y_{Ni}$, $0 \le y_{Mn} < 1$, $0 \le y_{Ni} < 1$, $1+2y_{Ni}-z \le x \le 1+2y_{Mn}+3y_{Ni}+5z$, $0 \le y < 1$, and $0 \le z < 1.5$ are satisfied. y is more preferably 0 to 0.2. z is more preferably 0 to 0.2.

<Positive Electrode Layer and Negative Electrode Layer>

As shown in FIG. 1, the positive electrode layer 1 has a positive electrode current collector layer 1A and a positive electrode active material layer 1B that contains a positive electrode active material. The negative electrode layer 2 has a negative electrode current collector layer 2A and a negative electrode active material layer 2B that contains a negative electrode active material.

The positive electrode current collector layer 1A and the negative electrode current collector layer 2A are preferably layers with high electronic conductivity. Therefore, it is preferable to use at least one selected from, for example, silver, palladium, gold, platinum, aluminum, copper, nickel, and the like for the positive electrode current collector layer 1A and the negative electrode current collector layer 2A. The positive electrode current collector layer 1A and the negative electrode current collector layer 2A are preferably formed only from one of these substances. Among these substances, copper does not easily react with the positive electrode active material, the negative electrode active material, and the solid electrolyte. Therefore, if copper is used for the positive electrode current collector layer 1A and the negative electrode current collector layer 2A, it is possible to reduce internal resistance of the all-solid lithium-ion secondary battery 10 by forming these layers merely with copper or forming these layers using copper as a main constituent, for example. Note that substances that are contained in the positive electrode current collector layer 1A and the negative electrode current collector layer 2A may be the same or different from each other.

The positive electrode active material layer 1B is formed on one surface or both surfaces of the positive electrode current collector layer 1A. In a case in which the positive electrode layer 1 out of the positive electrode layer 1 and the negative electrode layer 2 is formed in the uppermost layer of the layered body 4 in the lamination direction, for example, there is no facing negative electrode layer 2 on the positive electrode layer 1 located in the uppermost layer. Therefore, the positive electrode active material layer 1B may be provided only on one surface on the lower side of the positive electrode layer 1 located in the uppermost layer in the lamination direction.

The negative electrode active material layer 2B is also formed on one surface or both surfaces of the negative electrode current collector layer 2A similarly to the positive electrode active material layer 1B. In a case in which the negative electrode layer 2 out of the positive electrode layer 1 and the negative electrode layer 2 is formed in the lowermost layer of the layered body 4 in the lamination direction, for example, the negative electrode active material layer 2B may be provided only on one surface on the upper side of the negative electrode layer 2 located in the lowermost layer in the lamination direction.

The positive electrode active material layer 1B and the negative electrode active material layer 2B contain a positive electrode active material and a negative electrode active material that exchange electrons, respectively. In addition to them, the positive electrode active material layer 1B and the negative electrode active material layer 2B may contain an electroconductive aid, a binder, and the like as needed. The positive electrode active material and the negative electrode active material are preferably adapted such that lithium ions are efficiently inserted and desorbed.

For the positive electrode active material and the negative electrode active material, it is preferable to use, for example, a transition metal oxide or a transition metal composite oxide. Specifically, it is possible to use a lithium-manganese composite oxide $Li_2Mn_aMa_{1-a}O_3$ (0.8≤a≤1, Ma=Co, Ni), lithium cobaltate ($LiCoO_2$), lithium nickelate ($LiNiO_2$), lithium manganese spinel ($LiMn_2O_4$), a composite metal oxide represented as $LiNi_xCo_yMn_zO_2$ (x+y+z=1, 0≤x≤1, 0≤y≤1, 0≤z≤1), a lithium vanadium compound ($LiV_2O_5$), olivine-type $LiMbPO_4$ (where Mb is one or more kinds of element selected from Co, Ni, Mn, Fe, Mg, Nb, Ti, Al, and Zr), lithium vanadium phosphate ($Li_3V_2(PO_4)_3$ or $LiVOPO_4$), an Li excess solid solution represented as $Li_2MnO_3$-$LiMcO_2$ (Mc=Mn, Co, Ni), lithium titanate ($Li_4Ti_5O_{12}$), a composite metal oxide represented as $Li_sNi_tCo_uAl_vO_2$ (0.9<s<1.3, 0.9<t+u+v<1.1), or the like.

There is no clear distinction between which is the positive electrode active materials or the negative electrode active materials that are included in the positive electrode active material layer 1B and the negative electrode active material layer 2B. It is possible to decide which is the positive electrode active materials or the negative electrode active materials by comparing the potentials of two kinds of compound. For example, a compound with a superior potential can be used as a positive electrode active material, and a compound with an inferior potential can be used as a negative electrode active material.

Also, the positive electrode current collector layer 1A and the negative electrode current collector layer 2A may contain a positive electrode active material and a negative electrode active material, respectively. The amount of the active materials contained in the respective current collector layers is not particularly limited as long as the active materials function as current collectors. That is, the amounts of active materials contained in the current collectors can be arbitrarily selected. For example, the positive electrode current collector/the positive electrode active material or the negative electrode current collector/negative electrode active material falls within a range of 90/10 to 70/30 in terms of a volume ratio. Note that the volumes of the positive electrode current collector and the negative electrode current collector mean volumes of the current collector materials other than the active materials.

Adhesiveness between the positive electrode current collector layer 1A and the positive electrode active material layer 1B and between the negative electrode current collector layer 2A and the negative electrode active material layer 2B is improved by the positive electrode current collector layer 1A and the negative electrode current collector layer 2A containing the positive electrode active material and the negative electrode active material, respectively.

(Terminal Electrode)

The terminal electrodes 5 and 6 are formed such that they are in contact with side surfaces of the layered body 4 (surfaces from which the end surfaces of the positive electrode layer 1 and the negative electrode layer 2 are exposed) as shown in FIG. 1. The terminal electrodes 5 and 6 are connected to external terminals and are in charge of exchanging electrons with the layered body 4.

For the terminal electrodes 5 and 6, it is preferable to use a material with high electronic conductivity. For example, it is possible to use silver, gold, platinum, aluminum, copper, tin, nickel, gallium, indium, alloys thereof, or the like.

"Method for Manufacturing all-Solid Lithium-Ion Secondary Battery"

(Method for Manufacturing Solid Electrolyte)

The solid electrolyte 3 can be produced by an arbitrarily selected method, for example, a solid phase reaction method or the like. Specifically, the solid electrolyte 3 can be produced by mixing and sintering a compound containing phosphorous and zirconium contained in the basic skeleton with a compound containing substituting element. The amount of substitution of elements to be substituted, substitution sites, and the like can be controlled by adjusting the molar ratio at the time of the mixing.

The composition of the solid electrolyte 3 can be checked using X-ray fluorescence analysis (XRF) or high-frequency inductively coupled plasma optical emission spectroscopy (ICP). Also, whether or not the solid electrolyte 3 maintains a rhombohedral crystal can be checked through X-ray diffraction (XRD).

(Formation of Layered Body)

As a method for forming the layered body 4, an arbitrary method can be selected, and for example, a simultaneous sintering method may be used, or a sequential sintering method may be used.

The simultaneous sintering method is a method of laminating materials that form the respective layers and producing the layered body through collective sintering. The sequential sintering method is a method of producing the respective layers in order and performing a sintering process every time each layer is produced. It is possible to form the layered body 4 in a smaller number of operation processes in a case of using the simultaneous sintering method than in a case of using the sequential sintering method. Also, the obtained layered body 4 becomes denser in the case of using the simultaneous sintering method than in the case of using the sequential sintering method. Hereinafter, an exemplary example of a case in which the layered body 4 is manufactured using the simultaneous sintering method will be described.

The simultaneous sintering method has a process of producing pastes of the respective materials that are included in the layered body 4, a process of applying and drying the respective pastes producing a plurality of green sheets, a process of obtaining a layered sheet by laminating the green sheets, and a process of simultaneously sintering the layered sheet.

First, the respective materials for the positive electrode current collector layer 1A, the positive electrode active material layer 1B, the solid electrolyte 3, the negative electrode active material layer 2B, and the negative electrode current collector layer 2A that are included in the layered body 4 are prepared in the form of pastes.

A method of preparing the respective materials in the form of pastes is not particularly limited. For example, pastes may be obtained by mixing powder of the respective materials into vehicles. Here, the vehicles collectively refer to mediums in a liquid phase. The vehicles preferably contain solvents and binders.

The paste for the positive electrode current collector layer 1A, the paste for the positive electrode active material layer 1B, the paste for the solid electrolyte 3, the paste for the negative electrode active material layer 2B, and the paste for the negative electrode current collector layer 2A are produced by such the aforementioned method.

Then, green sheets are produced. The green sheets are obtained by applying the produced pastes to base materials such as polyethylene terephthalate (PET) films or the like, drying the pastes as needed, and peeling off the base materials from the sheets. A method of applying the pastes is not particularly limited. For example, a known method such as screen printing, application, transferring, or a doctor blade can be employed.

Next, the respectively produced green sheets are stacked in accordance with a desired order and the number of layers to be laminated, thereby obtaining a layered sheet. When the green sheets are laminated, alignment, cutting, or the like is performed as needed. In a case in which a parallel or serial battery is produced, for example, it is preferable to perform alignment and stack the green sheets such that the end surface of the positive electrode current collector layer does not conform to the end surface of the negative electrode current collector layer.

The layered sheet may be produced using a method of producing a positive electrode active material layer unit and a negative electrode active material layer unit, which will be described later, and laminating the positive electrode active material layer unit and the negative electrode active material layer unit. The positive electrode active material layer unit and the negative electrode active material layer unit may have the same shape and size or may have different shapes and sizes.

First, the paste for the solid electrolyte 3 is applied to a base material such as a PET film by a doctor blade method and is then dried, thereby forming the solid electrolyte 3 in the form of a sheet. Next, the paste for the positive electrode active material layer 1B is printed on the solid electrolyte 3 by screen printing and is then dried, thereby forming the positive electrode active material layer 1B. Then, the paste for the positive electrode current collector layer 1A is printed on the positive electrode active material layer 1B by screen printing and is then dried, thereby forming the positive electrode current collector layer 1A. Further, the paste for the positive electrode active material layer 1B is printed on the positive electrode current collector layer 1A by screen printing and is then dried, thereby forming the positive electrode active material layer 1B.

Thereafter, the PET film is peeled off, thereby obtaining the positive electrode active material layer unit. The positive electrode active material layer unit is a layered sheet in which the solid electrolyte 3, the positive electrode active material layer 1B, the positive electrode current collector layer 1A, and the positive electrode active material layer 1B are laminated in this order.

The negative electrode active material layer unit is produced in a similar procedure. The negative electrode active material layer unit is a layered sheet in which the solid electrolyte 3, the negative electrode active material layer 2B, the negative electrode current collector layer 2A, and the negative electrode active material layer 2B are laminated in this order.

Next, one positive electrode active material layer unit and one negative electrode active material layer unit are laminated. At this time, the positive electrode active material layer unit and the negative electrode active material layer unit are laminated such that the solid electrolyte 3 in the positive electrode active material layer unit is brought into contact with the negative electrode active material layer 2B in the negative electrode active material layer unit or the positive electrode active material layer 1B in the positive electrode active material layer unit is brought into contact with the solid electrolyte 3 in the negative electrode active material layer unit. In this manner, the layered sheet in which the positive electrode active material layer 1B, the positive electrode current collector layer 1A, the positive electrode active material layer 1B, the solid electrolyte 3, the negative electrode active material layer 2B, the negative electrode current collector layer 2A, the negative electrode active material layer 2B, and the solid electrolyte 3 are laminated in this order is obtained.

Note that when the positive electrode active material layer unit and the negative electrode active material layer unit are laminated, the respective units are stacked in a deviating manner such that the positive electrode current collector layer 1A in the positive electrode active material layer unit extends only toward one end surface and the negative electrode current collector layer 2A in the negative electrode active material layer unit extends only toward the other surface. Thereafter, the sheet for the solid electrolyte 3 with a predetermined thickness is further stacked on the surface on a side of the layered body in which the units are alternately staked, on which the solid electrolyte 3 is not present, thereby obtaining a layered sheet.

Next, the produced layered sheets are collectively pressure-bonded to each other.

The pressure-bonding is preferably performed while the layered sheets are heated. The heating temperature at the time of the pressure-bonding can be arbitrarily selected, and is set to 40 to 95° C., for example.

Next, debinding is performed by heating the pressure-bonded layered sheet to 500° C. to 750° C. in a nitrogen, hydrogen, and water vapor atmosphere, for example. Thereafter, the layered sheet is collectively subject to simultaneous sintering, thereby obtaining the layered body 4 that is a sintered body. The sintering of the layered sheet is performed by heating the layered sheet to 600° C. to 1000° C. in a nitrogen, hydrogen, and water vapor atmosphere, for example. The sintering time is, for example, 0.1 to 3 hours.

In the layered body 4 that is a sintered body, relative density of the active material and the solid electrolyte may be equal to or greater than 80%. Lithium-ion dispersion paths are more easily connected and ionic conductivity is enhanced as the relative density is higher.

In the layered body 4 that is a sintered body, an intermediate layer formed through element mutual dispersion may be included between the electrode layer and the solid electrolyte layer. It is possible to reduce the interface resistance between different materials by including the intermediate layer.

In the layered body 4 that is a sintered body, the electrolyte layer may have a core-shell structure that has a core region and a shell region with different metal ion concentrations or oxygen ion concentrations. It is possible to enhance electronic conductivity by having the core-shell structure.

The obtained sintered body (layered body 4) may be subject to barrel polishing by being placed in a cylindrical container along with a polishing material such as alumina. In this manner, it is possible to chamber corners of the layered body 4. In another method, the layered body 4 may be polished through sand blasting. This method is preferable since only a specific portion can be ground.

Note that according to the invention, a combination of the positive electrode layer, the negative electrode layer, and the solid electrolyte interposed between the positive electrode layer and the negative electrode layer preferably has a relative density of equal to or greater than 80%. The relative density may be equal to or greater than 85%, 90%, or 95%. The relative density is a value indicating a ratio of an actually measured density with respect to a theoretical density in units of %. The density when raw materials are completely densified may be regarded as the theoretical density. As a measurement method, an arbitrary method can be used, and for example, the relative density may be obtained through a dimension method or an Archimedes' method by measuring a weight or a volume.

The terminal electrodes 5 and 6 are formed at ends of the layered body 4 produced in the aforementioned procedure, thereby producing the all-solid lithium-ion secondary battery. The terminal electrodes 5 and 6 can be produced by means such as sputtering.

As described above, the all-solid lithium-ion secondary battery according to the embodiment has high ionic conductivity and large capacity. The ionic conductivity is maintained to be high since the solid electrolyte 3 maintains a rhombohedral crystal with high ionic conductivity, and discharge capacity becomes high since the solid electrolyte 3 maintains electronic insulation thereby preventing self-discharge.

The embodiments of the invention have been described above with reference to the drawings. As described above, the respective configurations, combinations thereof, and the like in the respective embodiments are just examples, and additions, omissions, replacements, and other modifications of the configurations can be made without departing from the gist of the invention.

EXAMPLES

"Changes in Characteristics of Solid Electrolyte in Charging and Discharging"

As shown in FIGS. 2A to 2D and FIGS. 3A to 3D, characteristics of the solid electrolyte when the number of Li atoms per composition formula changed were checked by measuring a potential of the solid electrolyte, a HOMO-LUMO gap of the solid electrolyte, and changes in valences of elements contained in the solid electrolyte. The measurement results corresponded to changes in characteristics of the solid electrolyte when the all-solid lithium-ion secondary battery was charged and discharged. These electronic states can be measured by systematically examining the electronic states through a UV-Vis spectrum or ultraviolet photoelectron spectroscopy (UPS) and inverse photoelectron spectroscopy (IPES) according to an experimental method. According to a simulation, the electron states can be measured by a first-principle simulation using a Vienna Ab initio Simulation Package (VASP), wien2k, PHASE, CASTEP, or the like. The electron states were measured through the first principle simulation using a Vienna Ab initio Simulation Package (VASP) this time.

Example 1-1

Figure 6A:
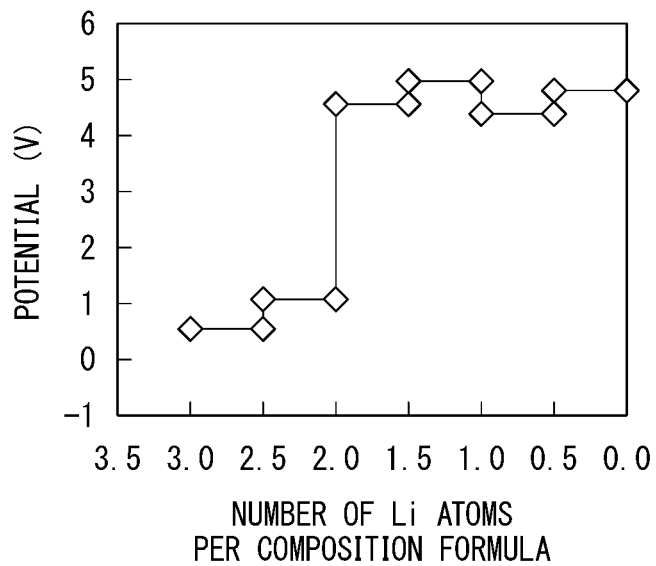
FIG. 6A is a diagram of a measured change in potential when the number of Li atoms per composition formula changes in $Li_{1+0.5x}Ni_{0.5}Zr_{1.5}(PO_4)_3$ in which a part of zirconium in $LiZr_2(PO_4)_3$ is substituted with nickel.
Figure 6B:
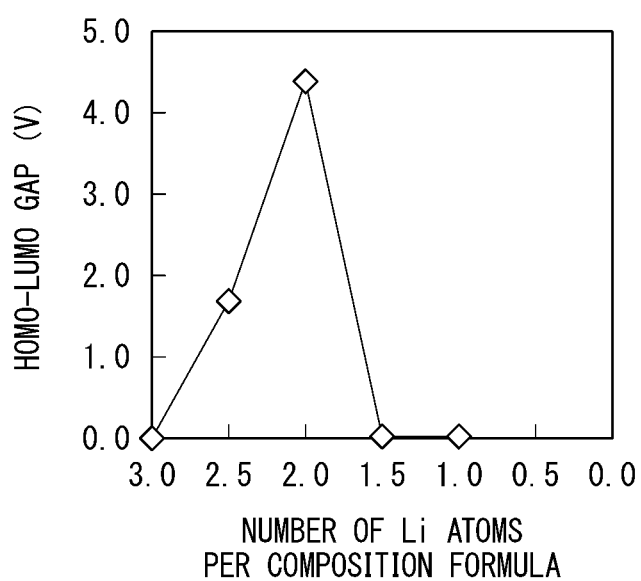
FIG. 6B is a diagram of a measured size of a HOMO-LUMO gap of a solid electrolyte with respect to the number of Li atoms per composition formula in $Li_{1+0.5x}Ni_{0.5}Zr_{1.5}(PO_4)_3$ in which a part of zirconium in $LiZr_2(PO_4)_3$ is substituted with nickel.
Figure 6C:
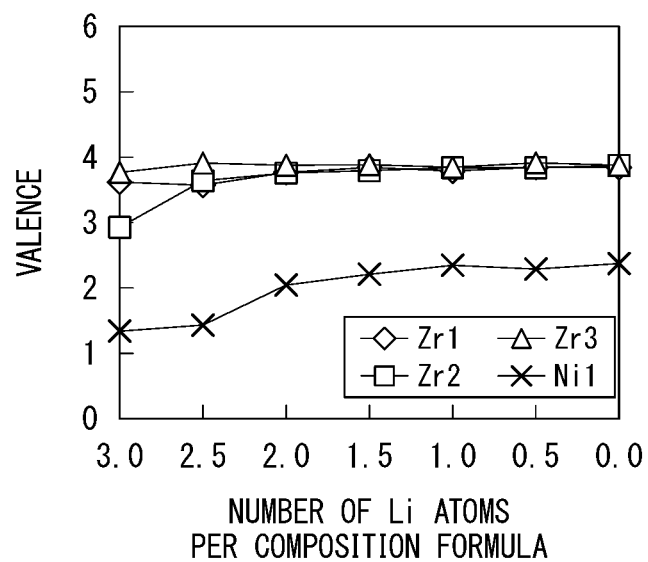
FIG. 6C is a diagram of measured changes in valences of zirconium and nickel contained in a solid electrolyte when the number of Li atoms per composition formula changes in $Li_{1+0.5x}Ni_{0.5}Zr_{1.5}(PO_4)_3$ in which a part of zirconium in $LiZr_2(PO_4)_3$ is substituted with nickel.
Figure 6D:
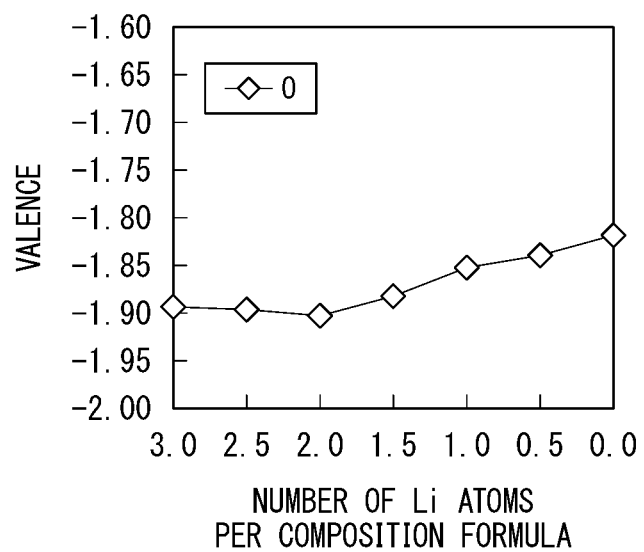
FIG. 6D is a diagram of a measured change in valence of oxygen contained in a solid electrolyte when the number of Li atoms per composition formula changes in $Li_{1+0.5x}Ni_{0.5}Zr_{1.5}(PO_4)_3$ in which a part of zirconium in $LiZr_2(PO_4)_3$ is substituted with nickel.

In Example 1-1, changes in characteristics of $Li_{1+0.5x}Ni_{0.5}Zr_{1.5}(PO_4)_3$ in which a part of zirconium of $LiZr_2(PO_4)_3$ was substituted with nickel were measured. The results are shown in FIGS. 6A to 6D. In FIGS. 6A to 6D, FIG. 6A is a diagram showing changes in potential when the number of Li atoms per composition formula changed. FIG. 6B is a diagram showing a size of a HOMO-LUMO gap of the solid electrolyte with respect to the number of Li atoms per composition formula. FIG. 6C is a diagram showing changes in valences of zirconium and nickel contained in the solid electrolyte when the number of Li atoms per composition formula changed. FIG. 6D is a diagram showing a change in valence of oxygen contained in the solid electrolyte when the number of Li atoms per composition formula changed.

As shown in FIG. 6B, the solid electrolyte maintained electronic insulation within a range of the number of Li atoms from about 1.6 to about 2.8 in a case in which a part of zirconium was substituted with nickel. This was also able to be confirmed from the fact that the valences of zirconium and oxygen shown in FIGS. 6C and 6D did not greatly change with respect to variations in the number of Li atoms.

Example 1-2

Figure 7A:
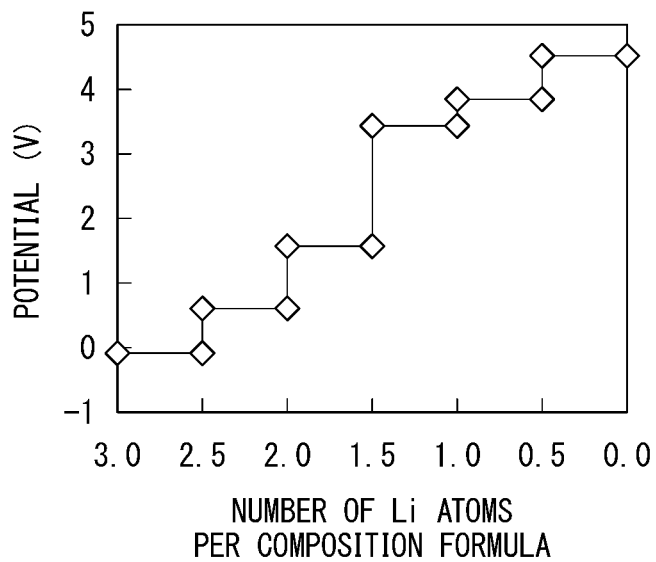
FIG. 7A is a diagram of a measured change in potential when the number of Li atoms per composition formula changes in $Li_{1+0.5x}V_{0.5}Zr_{1.5}(PO_4)_3$ in which a part of zirconium in $LiZr_2(PO_4)_3$ is substituted with vanadium.
Figure 7B:
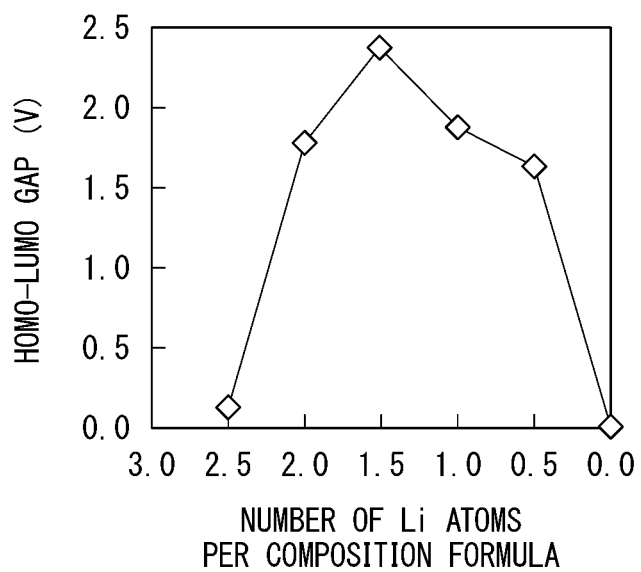
FIG. 7B is a diagram of a measured size of a HOMO-LUMO gap of a solid electrolyte with respect to the number of Li atoms per composition formula in $Li_{1+0.5x}V_{0.5}Zr_{1.5}(PO_4)_3$ in which a part of zirconium in $LiZr_2(PO_4)_3$ is substituted with vanadium.
Figure 7C:
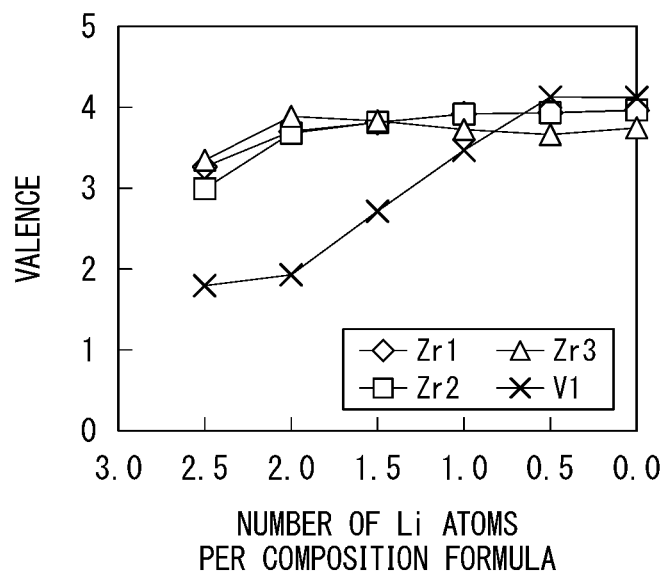
FIG. 7C is a diagram of measured changes in valences of zirconium and vanadium contained in a solid electrolyte when the number of Li atoms per composition formula changes in $Li_{1+0.5x}V_{0.5}Zr_{1.5}(PO_4)_3$ in which a part of zirconium in $LiZr_2(PO_4)_3$ is substituted with vanadium.
Figure 7D:
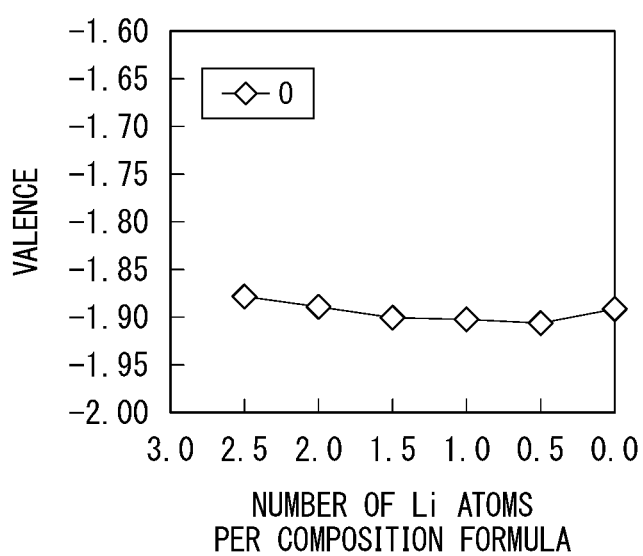
FIG. 7D is a diagram of a measured change in valence of oxygen contained in a solid electrolyte when the number of Li atoms changes in $Li_{1+0.5x}V_{0.5}Zr_{1.5}(PO_4)_3$ in which a part of zirconium in $LiZr_2(PO_4)_3$ is substituted with vanadium.

In Example 1-2, changes in characteristics of $Li_{1+0.5x}V_{0.5}Zr_{1.5}(PO_4)_3$ in which a part of zirconium of $LiZr_2(PO_4)_3$ was substituted with zirconium were measured. The results are shown in FIGS. 7A to 7D. In FIGS. 7A to 7D, FIG. 7A is a diagram showing changes in potential when the number of Li atoms per composition formula changed. FIG. 7B is a diagram showing the size of a HOMO-LUMO gap of the solid electrolyte with respect to the number of Li atoms per composition formula. FIG. 7C is a diagram showing changes in valences of zirconium and vanadium contained in the solid electrolyte when the number of Li atoms per composition formula changed. FIG. 7D is a diagram showing changes in valence of oxygen contained in the solid electrolyte when the number of Li atoms changed.

As shown in FIG. 7B, the solid electrolyte maintained electronic insulation within a range of the number of Li atoms from about 0.2 to about 2.3 in a case in which a part of zirconium is substituted with vanadium. This was able to be confirmed from the fact that the valences of zirconium and oxygen shown in FIGS. 7C and 7D did not greatly change with respect to variations in the number of Li atoms.

Example 1-3

Figure 8A:
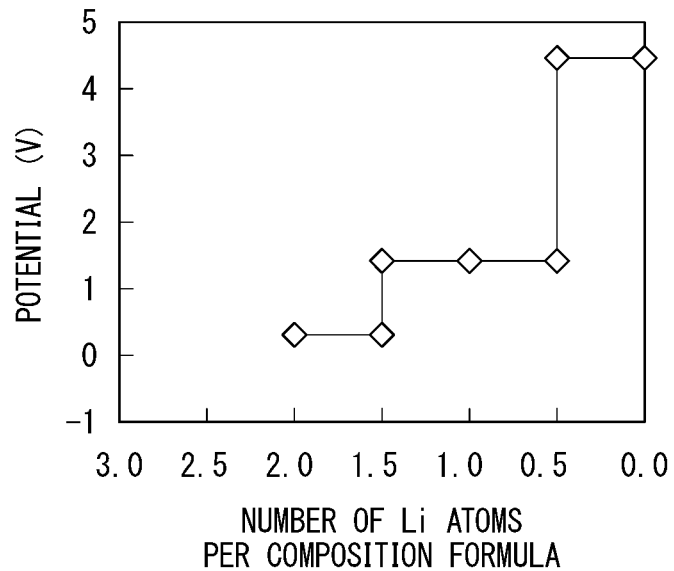
FIG. 8A is a diagram of a measured change in potential when the number of Li atoms per composition formula changes in $Li_{1+0.5x}Ta_{0.5}Zr_{1.5}(PO_4)_3$ in which a part of zirconium in $LiZr_2(PO_4)_3$ is substituted with tantalum.
Figure 8B:
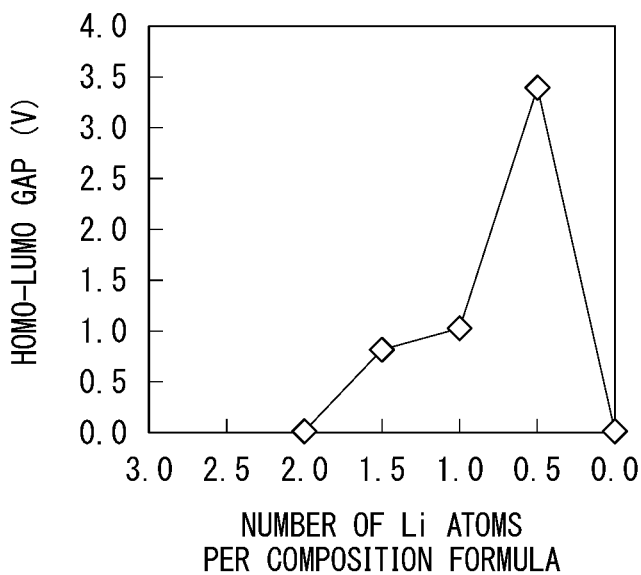
FIG. 8B is a diagram of a measured size of a HOMO-LUMO gap in a solid electrolyte with respect to the number of Li atoms per composition formula in $Li_{1+0.5x}Ta_{0.5}Zr_{1.5}(PO_4)_3$ in which a part of zirconium in $LiZr_2(PO_4)_3$ is substituted with tantalum.
Figure 8C:
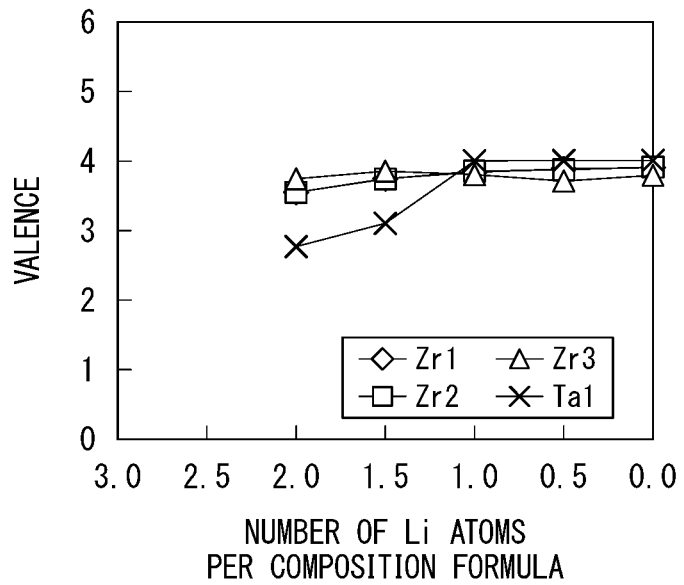
FIG. 8C is a diagram of measured changes in valences of zirconium and tantalum contained in a solid electrolyte when the number of Li atoms per composition formula changes in $Li_{1+0.5x}Ta_{0.5}Zr_{1.5}(PO_4)_3$ in which a part of zirconium in $LiZr_2(PO_4)_3$ is substituted with tantalum.
Figure 8D:
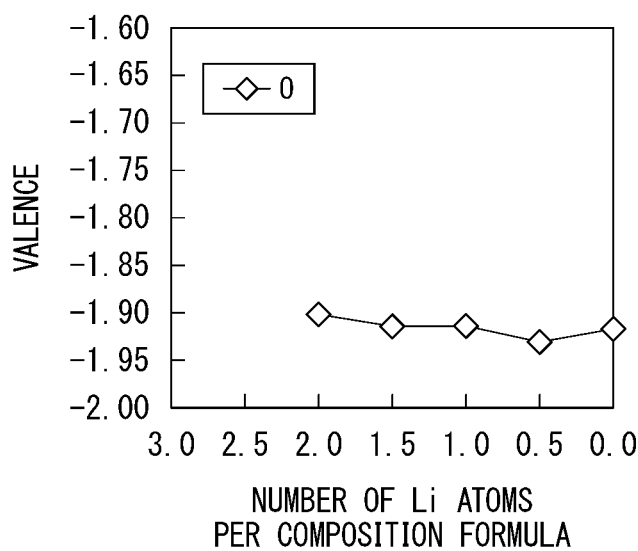
FIG. 8D is a diagram of a measured change in valence of oxygen contained in a solid electrolyte when the number of Li toms per composition formula changes in $Li_{1+0.5x}Ta_{0.5}Zr_{1.5}(PO_4)_3$ in which a part of zirconium in $LiZr_2(PO_4)_3$ is substituted with tantalum.

In Example 1-3, changes in characteristics of $Li_{1+0.5x}Ta_{0.5}Zr1.5(PO_4)_3$ in which a part of zirconium of $LiZr_2(PO_4)_3$ was substituted with tantalum were measured. Results are shown in FIGS. 8A to 8D. In FIGS. 8A to 8D, FIG. 8A is a diagram showing changes in potential when the number of Li atoms per composition formula changed. FIG. 8B is a diagram showing a size of a HOMO-LUMO gap of the solid electrolyte with respect to the number of Li atoms per composition formula. FIG. 8C is a diagram showing changes in valences of zirconium and tantalum contained in the solid electrolyte when the number of Li atoms per composition formula changed. FIG. 8D is a diagram showing a change in a valence of oxygen contained in the solid electrolyte when the number of Li atoms per composition formula changed.

As shown in FIG. 8B, the solid electrolyte maintained electronic insulation within a range of the number of Li atoms from about 0.1 to about 1.7 in a case in which a part of zirconium was substituted with tantalum. This was also confirmed from the fact that the valences of zirconium and oxygen shown in FIGS. 8C and 8D did not greatly change with respect to variations in the number of Li atoms.

Example 1-4

Figure 9A:
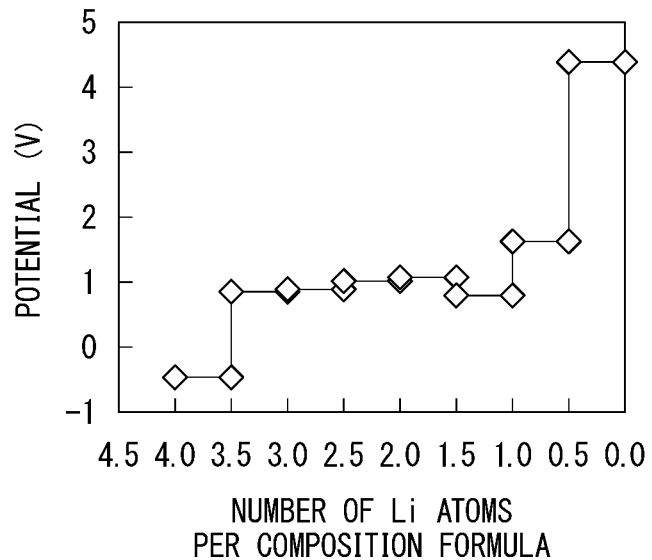
FIG. 9A is a diagram of a measured change in potential when the number of Li atoms per composition formula changes in $Li_{1+0.5x}Zr_2W_{0.5}P_{2.5}O_{12}$ in which a part of phosphorous in $LiZr_2(PO_4)_3$ is substituted with tungsten.
Figure 9B:
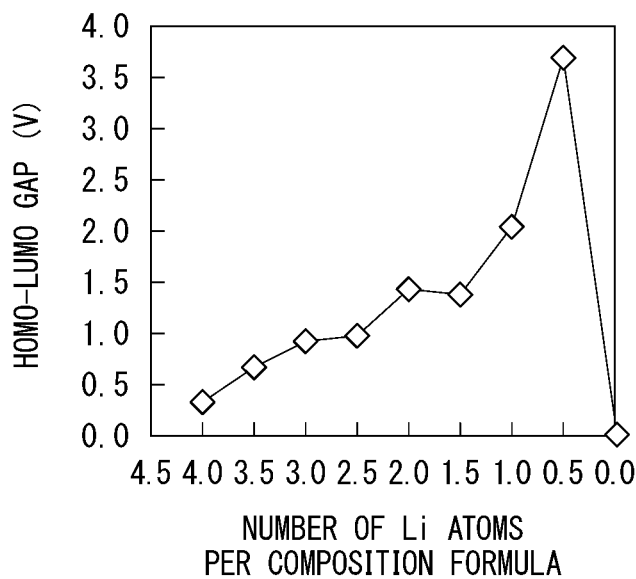
FIG. 9B is a diagram of a measured size of a HOMO-LUMO gap of a solid electrolyte with respect to the number of Li atoms per composition formula in $Li_{1+0.5x}Zr_2W_{0.5}P_{2.5}O_{12}$ in which a part of phosphorous in $LiZr_2(PO_4)_3$ is substituted with tungsten.
Figure 9C:
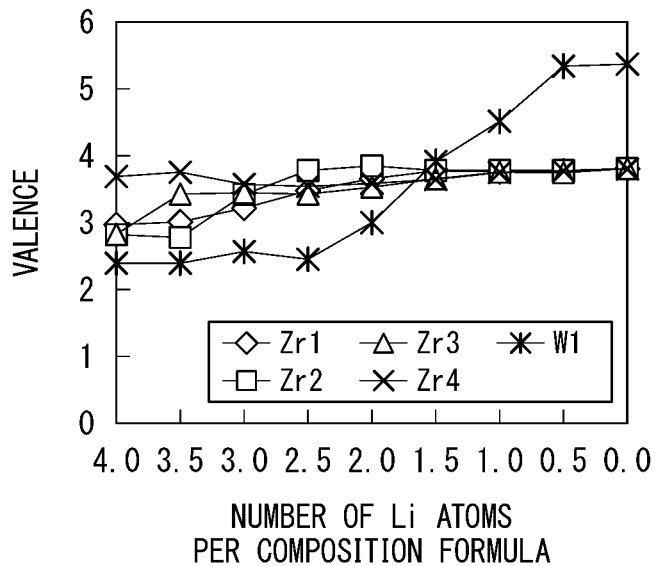
FIG. 9C is a diagram of measured changes in valences of zirconium and tungsten contained in a solid electrolyte when the number of Li atoms per composition formula changes in $Li_{1+0.5x}Zr_2W_{0.5}P_{2.5}O_{12}$ in which a part of phosphorous in $LiZr_2(PO_4)_3$ is substituted with tungsten.
Figure 9D:
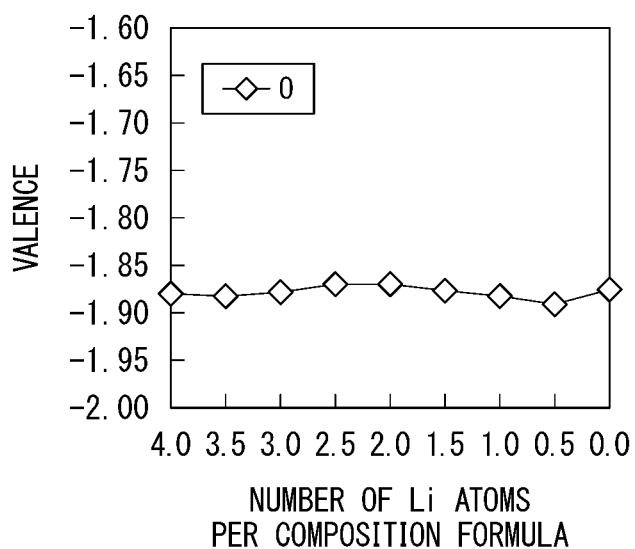
FIG. 9D is a diagram of a measured change in valence of oxygen contained in a solid electrolyte when the number of Li atoms per composition formula changes in $Li_{1+0.5x}Zr_2W_{0.5}P_{2.5}O_{12}$ in which a part of phosphorous in $LiZr_2(PO_4)_3$ is substituted with tungsten.

In Example 1-4, changes in characteristics of $Li_{1+0.5x}Zr_2W_{0.5}P_{2.5}O_{12}$ in which a part of phosphorous of $LiZr_2(PO_4)_3$ was substituted with tungsten were measured. The results are shown in FIG. 9. In FIGS. 9A to 9D, FIG. 9A is a diagram showing a change in potential when the number of Li atoms per composition formula changed. FIG. 9B is a diagram showing a size of a HOMO-LUMO gap of the solid electrolyte with respect to the number of Li atoms per composition formula. FIG. 9C is a diagram showing changes in valences of zirconium and tungsten contained in the solid electrolyte when the number of Li atoms per composition formula changed. FIG. 9D is a diagram showing a change in valence of oxygen contained in the solid electrolyte when the number of Li atoms per composition formula changed.

As shown in FIG. 9B, the solid electrolyte maintained electronic insulation within a range of the number of Li atoms from about 0.2 to about 3.8 in a case in which a part of phosphorous was substituted with tungsten. This was also confirmed from the fact that the valences of zirconium and oxygen shown in FIGS. 9C and 9D did not greatly change with respect to variations in the number of Li atoms.

Example 1-5

Figure 10A:
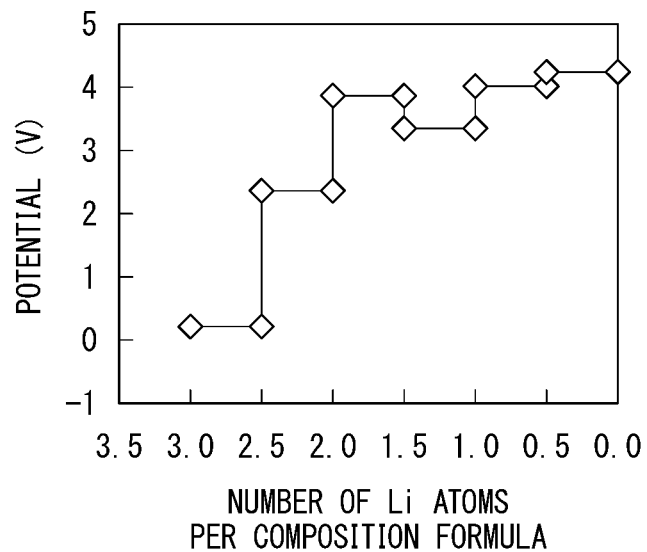
FIG. 10A is a diagram of a measured change in potential when the number of Li atoms per composition formula changes in $Li_{1+0.5x}Zr_2Mn_{0.5}P_{2.5}O_{12}$ in which a part of phosphorous in $LiZr_2(PO_4)_3$ is substituted with manganese.
Figure 10B:
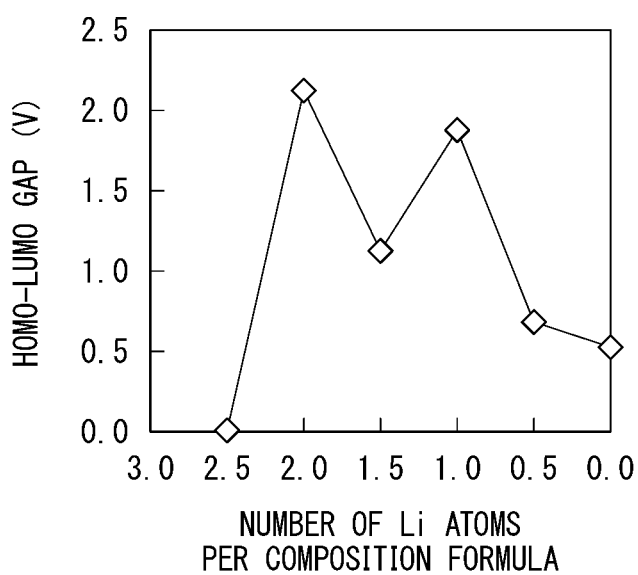
FIG. 10B is a diagram of a measured size of a HOMO-LUMO gap of a solid electrolyte with respect to the number of Li atoms per composition formula in $Li_{1+0.5x}Zr_2Mn_{0.5}P_{2.5}O_{12}$ in which a part of phosphorous in $LiZr_2(PO_4)_3$ is substituted with manganese.
Figure 10C:
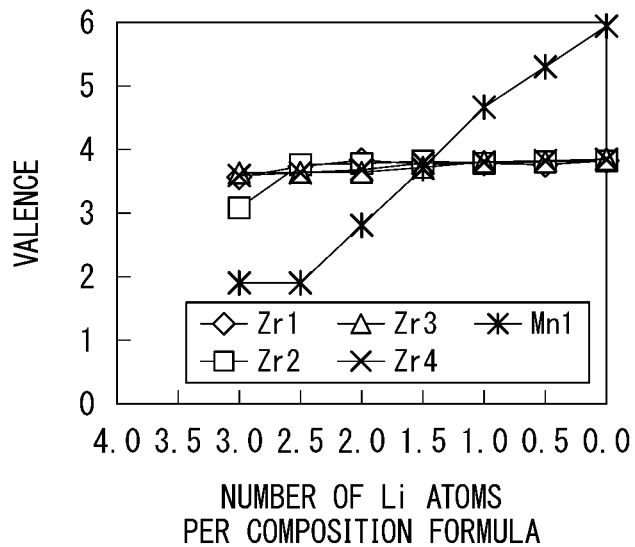
FIG. 10C is a diagram of measured changes in valences of zirconium and manganese contained in a solid electrolyte when the number of Li atoms per composition formula changes in $Li_{1+0.5x}Zr_2Mn_{0.5}P_{2.5}O_{12}$ in which a part of phosphorous in $LiZr_2(PO_4)_3$ is substituted with manganese.
Figure 10D:
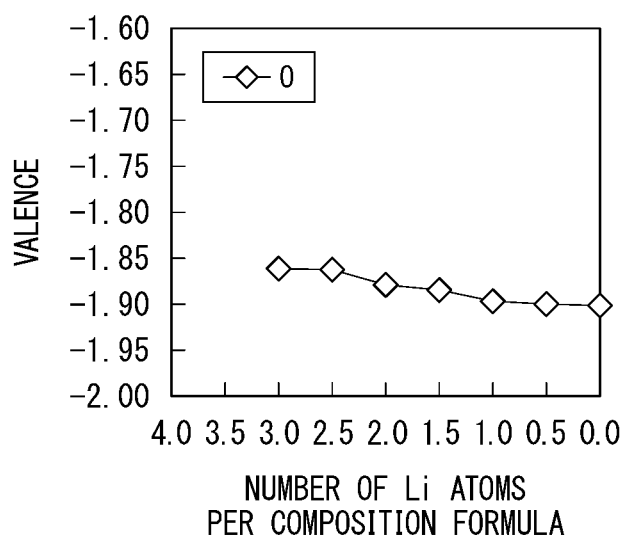
FIG. 10D is a diagram of a measured change in valence of oxygen contained in a solid electrolyte when the number of Li atoms per composition formula changes in $Li_{1+0.5x}Zr_2Mn_{0.5}P_{2.5}O_{12}$ in which a part of phosphorous in $LiZr_2(PO_4)_3$ is substituted with manganese.

In Example 1-5, changes in characteristics of $Li_{1+0.5x}Zr_2Mn_{0.5}P_{2.5}O_{12}$ in which a part of phosphorous of $LiZr_2(PO_4)_3$ was substituted with manganese were measured. The results are shown in FIGS. 10A to 10D. In FIGS. 10A to 10D, FIG. 10A is a diagram showing a change in potential when the number of Li atoms per composition formula changed. FIG. 10B is a diagram showing a size of a HOMO-LUMO gap of the solid electrolyte with respect to the number of Li atoms per composition formula. FIG. 10C is a diagram showing changes in valences of zirconium and manganese contained in the solid electrolyte when the number of Li atoms per composition formula changed. FIG. 10D is a diagram showing a change in valence of oxygen contained in the solid electrolyte when the number of Li atoms per composition formula changed.

As shown in FIG. 10B, the solid electrolyte maintained electronic insulation within a range of the number of Li atoms from about 0 to about 2.3 in a case in which a part of phosphorous was substituted with manganese. This was also confirmed from the fact that valences of zirconium and oxygen shown in FIGS. 10C and 10D did not greatly change with respect to variations in the number of Li atoms.

When a part of phosphorous or zirconium of $LiZr_2(PO_4)_3$ was substituted with an element with a variable valence as described above, the solid electrolyte can maintain electronic insulation in a wide range regardless of a large variation in the number of Li atoms in any cases unlike the case in which substitution was performed with an element with a valence that did not easily change shown in FIGS. 2A to 2D.

"Band Structure of Solid Electrolyte"

As described above, all the solid electrolytes described in Examples 1-1 to 1-5 were able to maintain electronic insulation within wide ranges regardless of changes in the numbers of Li. Meanwhile, the ranges of the numbers of Li atoms per composition formula with which the solid electrolyte can maintain electronic insulation differed depending on the respective materials. In order to find out the reason for the differences, how many times as many unoccupied impurity levels and occupied impurity levels were formed in band gap as amount of substitution of the substituting element by substituting a part of zirconium or phosphorous in $LiZr_2(PO_4)_3$ with the substituting element was measured using a Vienna Ab initio Simulation Package (VASP). The results are shown in Tables 1 and 2.

Also, at the same time, how many times as much as amount of substitution of the substituting element oxidized the level derived from oxygen forming the basic skeleton of the solid electrolyte was measured. In a case in which the levels derived from oxygen forming the basic skeleton of the solid electrolyte is oxidized, electronic insulation was lost.

TABLE 1

| | | | Multiple of level formed with respect to amount of substitution of substituted element | | Multiple of levels derived from oxugen oxidized with respect to amount of substitution of |
|---|---|---|---|---|---|
| | Substitution site | Substituting element | Occupied impurity level | Unoccupied impurity level | substituted element |
| Comparative Example 1 | Zr | Ca | 0 | 0 | 2 |
| Example 2-1 | Zr | Ti | 0 | 1 | 0 |
| Example 2-2 | Zr | V | 1 | 2 | 0 |
| Example 2-3 | Zr | Cr | 0 | 2 | 0 |
| Example 2-4 | Zr | Mn | 0 | 2 | 0 |
| Example 2-5 | Zr | Fe | 0 | 1 | 1 |
| Example 2-6 | Zr | Co | 0 | 1 | 2 |
| Example 2-7 | Zr | Ni | 0 | 1 | 2 |
| Example 2-8 | Zr | Cu | 0 | 2 | 1 |
| Example 2-9 | Zr | Zn | 0 | 1 | 1 |
| Example 2-10 | Zr | Nb | 1 | 1 | 0 |
| Example 2-11 | Zr | Sb | 1 | 2 | 0 |
| Example 2-12 | Zr | Ta | 1 | 1 | 0 |
| Example 2-13 | Zr | Bi | 2 | 1 | 0 |
| Example 2-14 | Zr | Mo | 2 | 1 | 0 |
| Example 2-15 | Zr | Tc | 2 | 2 | 0 |
| Example 2-16 | Zr | W | 2 | 1 | 0 |

TABLE 2

| | Substitution site | Substituting element | Multiple of level formed with respect to amount of substitution of substituted element | | Multiple of levels derived from oxugenoxidized with respect to amount of substitution of substituted element |
|---|---|---|---|---|---|
| | | | Occupied impurity level | Unoccupied impurity level | |
| Example 2-17 | P | Ge | 1 | 1 | 0 |
| Example 2-18 | P | Mo | 1 | 3 | 0 |
| Example 2-19 | P | Sb | 0 | 2 | 0 |
| Example 2-20 | P | W | 1 | 5 | 0 |
| Example 2-21 | P | Bi | 0 | 2 | 0 |
| Example 2-22 | P | Cr | 1 | 1 | 0 |
| Example 2-23 | P | Mn | 2 | 3 | 0 |
| Example 2-24 | P | Fe | 2 | 3 | 0 |
| Example 2-25 | P | Se | 1 | 2 | 0 |
| Example 2-26 | P | Te | 1 | 3 | 0 |
| Example 2-27 | P | V | 0 | 3 | 0 |

In the results shown in Tables 1 and 2 described above, Example 1-1 corresponded to Example 2-7, Example 1-2 corresponded to Example 2-2, Example 1-3 corresponded to Example 2-12, Example 1-4 corresponded to Example 2-20, Example 1-5 corresponded to Example 2-23, the example in which substitution with Ca was made shown in FIGS. 2A to 2D corresponded to Comparative Example 2-1, the example in which zirconium was substituted with manganese shown in FIGS. 3A to 3D corresponded to Example 2-4.

In matching the results in Tables 1 and 2 described above with the results of Examples 1-1 to 1-5, FIGS. 2A to 2D, and FIGS. 3A to 3D, there was a trend that the solid electrolyte was able to maintain electronic insulation regardless of large variations in the number of Li atoms per composition formula when the amounts of introduction of the occupied impurity level and the unoccupied impurity level to the solid electrolyte increased.

"Actual Measurement of Various Characteristics of Solid Electrolyte"

Since the aforementioned results are results of simulation, solid electrolytes were actually produced, and ionic conductivity and electronic conductivity of the solid electrolytes were actually measured. Also, all-solid lithium-ion secondary batteries were actually produced, and capacities thereof were measured. The results are shown in Tables 3 and 4.

The solid electrolytes in Examples 3-1 to 3-16 were represented as $Li_xM1_yZr_{2-y}W_zP_{3-z}O_{12}$. M1 is at least one of Mn and Ni. $y_{Mn}$ in the tables represents the amount of Mn, and $y_{Ni}$ represents the amount of Ni. x, y, and z are shown in Tables 3 and 4. Meanwhile, the solid electrolyte in Comparative Example 3-1 was $Li_xZr(PO_3)_4$, and the solid electrolyte in Comparative Example 3-2 was $Li_xCa_yZr_{2-y}(PO_3)_4$.

TABLE 3

| | x | Substituted element | y | $y_{Mn}$ | $y_{Ni}$ | z | Crystal system (25° C.) | Electronic conductivity (S/cm) | Ionic conductivity (S/cm) | Discharge capacity (μAh) |
|---|---|---|---|---|---|---|---|---|---|---|
| Example 3-1 | 1.0 | Mn | 0.1 | 0.1 | 0 | 0 | Rhombohedral crystal | $5.3 \times 10^{-11}$ | $5.9 \times 10^{-6}$ | 4.21 |
| Example 3-2 | 1.2 | Mn | 0.1 | 0.1 | 0 | 0 | Rhombohedral crystal | $6.1 \times 10^{-11}$ | $8.9 \times 10^{-6}$ | 4.19 |
| Example 3-3 | 1.2 | Ni | 0.1 | 0 | 0.1 | 0 | Rhombohedral crystal | $2.7 \times 10^{-11}$ | $8.0 \times 10^{-6}$ | 4.08 |
| Example 3-4 | 1.3 | Ni | 0.1 | 0 | 0.1 | 0 | Rhombohedral crystal | $8.9 \times 10^{-11}$ | $9.2 \times 10^{-6}$ | 4.03 |
| Example 3-5 | 0.9 | W | 0 | 0 | 0 | 0.1 | Rhombohedral crystal | $3.8 \times 10^{-11}$ | $7.5 \times 10^{-6}$ | 4.45 |
| Example 3-6 | 1.2 | W | 0 | 0 | 0 | 0.1 | Rhombohedral crystal | $5.2 \times 10^{-11}$ | $7.6 \times 10^{-6}$ | 4.41 |
| Example 3-7 | 1.5 | W | 0 | 0 | 0 | 0.1 | Rhombohedral crystal | $2.0 \times 10^{-11}$ | $8.4 \times 10^{-6}$ | 4.37 |

TABLE 4

| | x | Substituted element | y | $y_{Mn}$ | $y_{Ni}$ | z | Crystal system (25° C.) | Electronic conductivity (S/cm) | Ionic conductivity (S/cm) | Discharge capacity (μAh) |
|---|---|---|---|---|---|---|---|---|---|---|
| Example 3-8 | 1.2 | Mn + Ni | 0.2 | 0.1 | 0.1 | 0 | Rhombohedral crystal | $6.1 \times 10^{-11}$ | $7.6 \times 10^{-6}$ | 4.29 |
| Example 3-9 | 1.4 | Mn + Ni | 0.2 | 0.1 | 0.1 | 0 | Rhombohedral crystal | $5.2 \times 10^{-11}$ | $6.0 \times 10^{-6}$ | 4.24 |

TABLE 4-continued

|  | x | Substituted element | y | $y_{Mn}$ | $y_{Ni}$ | Z | Crystal system (25° C.) | Electronic conductivity (S/cm) | Ionic conductivity (S/cm) | Discharge capacity (μAh) |
|---|---|---|---|---|---|---|---|---|---|---|
| Example 3-10 | 1.5 | Mn + Ni | 0.2 | 0.1 | 0.1 | 0 | Rhombohedral crystal | $3.8 \times 10^{-11}$ | $6.1 \times 10^{-6}$ | 4.23 |
| Example 3-11 | 0.9 | Mn + W | 0.1 | 0.1 | 0 | 0.1 | Rhombohedral crystal | $1.1 \times 10^{-11}$ | $8.9 \times 10^{-6}$ | 4.51 |
| Example 3-12 | 1.3 | Mn + W | 0.1 | 0.1 | 0 | 0.1 | Rhombohedral crystal | $2.2 \times 10^{-11}$ | $8.2 \times 10^{-6}$ | 4.44 |
| Example 3-13 | 1.7 | Mn + W | 0.1 | 0.1 | 0 | 0.1 | Rhombohedral crystal | $4.9 \times 10^{-11}$ | $9.3 \times 10^{-6}$ | 4.53 |
| Example 3-14 | 1.1 | Ni + W | 0.1 | 0 | 0.1 | 0.1 | Rhombohedral crystal | $6.8 \times 10^{-11}$ | $6.5 \times 10^{-6}$ | 4.34 |
| Example 3-15 | 1.5 | Ni + W | 0.1 | 0 | 0.1 | 0.1 | Rhombohedral crystal | $1.0 \times 10^{-11}$ | $8.1 \times 10^{-6}$ | 4.48 |
| Example 3-16 | 1.8 | Ni + W | 0.1 | 0 | 0.1 | 0.1 | Rhombohedral crystal | $7.5 \times 10^{-11}$ | $6.6 \times 10^{-6}$ | 4.39 |
| Comparative Example 3-1 | 1 | — | 0 | 0 | 0 | 0 | Triclinic crystal | $8.4 \times 10^{-11}$ | $2.0 \times 10^{-6}$ | 0.67 |
| Comparative Example 3-2 | 1.2 | Ca | 0.1 | 0 | 0 | 0 | Rhombohedral crystal | $4.3 \times 10^{-11}$ | $3.6 \times 10^{-6}$ | 3.92 |

The ionic conductivity was obtained through an AC impedance measurement by producing sintered bodies of the solid electrolytes and forming electrodes in the sintered bodies by Pt sputtering. In the AC impedance measurement, an applied voltage amplitude was set to 10 mV, and a measurement frequency was set to 0.01 Hz to 1 MHz. Li ionic conductivity at a room temperature was obtained from Nyquist plots obtained by the AC impedance measurement.

The electronic conductivity was measured for produced sintered bodies of the solid electrolytes. Current values flowing when a voltage of 1V was applied to the produced sintered bodies were measured, DC resistances were obtained, and electronic conductivity was thus calculated.

All-solid lithium-ion secondary batteries were actually produced, and a charging and discharging test was conducted. As measurement conditions, a current for both the charging and the discharging was set to 2.0 μA, cut-off voltages for the charging and the discharging were set to 4.0 V and 0 V, respectively, and charge capacities were recorded. Each all-solid lithium-ion secondary battery was produced using the simultaneous sintering method by laminating the solid electrolyte 3, the positive electrode active material layer 1B, the positive electrode current collector layer 1A, the positive electrode active material layer 1B, the solid electrolyte 3, the negative electrode active material layer 2B, the negative electrode current collector layer 2A, the negative electrode active material layer 2B, and the solid electrolyte 3 in this order. Cu was used for the positive electrode current collector layer and the negative electrode current collector layer, and $Li_3V_2(PO_4)_3$ was used for both the positive electrode active material layer and the negative electrode active material layer.

As shown in Table 3, the solid electrolytes in which a part of $Li_xZr_2(PO_3)_4$ was substituted with an element (Examples 3-1 to 3-16 and Comparative Example 3-2) maintained rhombohedral crystal structures at the room temperature and exhibited high ionic conductivity. Also, the discharge capacities of the all-solid lithium-ion secondary batteries increased by employing elements with variable valences as the substituted elements (Examples 3-1 to 3-16). This is considered to be because the solid electrolytes contained in the all-solid lithium-ion secondary batteries maintained electronic insulation and self-discharge of the all-solid lithium-ion secondary batteries was prevented. The results highly corresponded to the results of the simulation.

INDUSTRIAL APPLICABILITY

A solid electrolyte that maintains a crystal structure with high ionic conductivity and that can maintain electronic insulation even when the amount of Li varies.

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte
3a Unoccupied impurity level
3b Occupied impurity level
4 Layered body
5, 6 Terminal electrode
10 All-solid lithium-ion secondary battery
C Conduction band
L0 Location 0
L1 Location 1
L2 Location 2
L1' Location 1'
L2' Location 2'
LUMO Lowest unoccupied orbital
HOMO Highest occupied orbital
V Valence band

What is claimed is:

1. A solid electrolyte which is a zirconium phosphate-based solid electrolyte, wherein a part of phosphorous or zirconium that is contained in the solid electrolyte is substituted with an element with a variable valence, and the solid electrolyte does not contain Ti,
   wherein the element with a variable valence when substituted for a part of phosphorous is at least one selected from the group consisting of Cr, Mn, Fe, Co, Ni, Zn, Sb, Bi, Mo, Te, W, and Se, and
   wherein the element with a variable valence when substituted for a part of zirconium is at least one selected from the group consisting of Cr, Mn, Fe, Co, Sb, Bi, Mo, Te, W, and Se.

2. The solid electrolyte according to claim 1, wherein a part of zirconium that is contained in the solid electrolyte is substituted with at least one selected from the group consisting of Sb, Bi, Mo, Te, and W or a part of phosphorous that is contained in the solid electrolyte is substituted with at least one selected from the group consisting of Ge, Mo, W, Cr, Mn, Fe, Se, and Te.

3. The solid electrolyte according to claim 1, wherein a part of zirconium that is contained in the solid electrolyte is substituted with at least one selected from the group consisting of Cr, Mn, Nb, Sb, Bi, Mo, Te, and W or a part of phosphorous that is contained in the solid electrolyte is substituted with at least one selected from the group consisting of Ge, Mo, Sb, W, Bi, Cr, Mn, Fe, Se, and Te.

4. An all-solid lithium-ion secondary battery comprising: the solid electrolyte according to claim 1.

5. The all-solid lithium-ion secondary battery according to claim 4, wherein a relative density of a pair of electrode layers and a solid electrolyte layer that has the solid electrolyte between the pair of electrode layers is equal to or greater than 80%.

6. The solid electrolyte according to claim 1,
wherein the element with a variable valence when substituted for a part of phosphorous is at least one selected from the group consisting of Cr, Mn, Fe, Co, Zn, Sb, Bi, Mo, Te, W, and Se, and
wherein the element with a variable valence when substituted for a part of zirconium is at least one selected from the group consisting of Cr, Mn, Fe, Co, Sb, Bi, Mo, Te, W, and Se.

7. The solid electrolyte according to claim 1, wherein a crystal state of the solid electrolyte is rhombohedral crystal at room temperature.

8. The solid electrolyte according to claim 6, wherein a crystal state of the solid electrolyte is rhombohedral crystal at room temperature.

9. A solid electrolyte, comprising:
a compound represented as a formula $Li_xM1_yZr_{2-y}W_zP_{3-z}O_{12}$,
wherein M1 is at least one selected from the group consisting of Mn and Ni, and
in a case in which an amount of Mn in M1 is assumed to be $y_{Mn}$, and an amount of Ni is assumed to be $y_{Ni}$, $0 \leq y_{Mn} < 1$, $0 \leq y_{Ni} < 1$, $1+2y_{Ni}-z \leq x \leq 1+2y_{Mn}+3y_{Ni}+5z$, $y = y_{Mn}+y_{Ni}$, $0 \leq y < 1$, $0 < z < 1.5$ are satisfied.

10. The solid electrolyte according to claim 9 comprising: only the compound represented as a formula $Li_xM1_yZr_{2-y}W_zP_{3-z}O_{12}$.

11. A solid electrolyte which is a zirconium phosphate-based solid electrolyte,
wherein a part of phosphorous and optionally a part of zirconium that is contained in the solid electrolyte is substituted with an element with a variable valence,
wherein a part of phosphorous that is contained in the solid electrolyte is substituted with at least one selected from the group consisting of Mo, Sb, W, Bi, Cr, Mn, Fe, Se, Te, and V.

* * * * *